United States Patent
Xue et al.

(10) Patent No.: US 11,678,371 B2
(45) Date of Patent: Jun. 13, 2023

(54) CONFIGURED GRANT SIDELINK COMMUNICATIONS

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Piyush Gupta, Bridgewater, NJ (US); Xiaojie Wang, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,427

(22) Filed: Jun. 21, 2021

(65) Prior Publication Data
US 2022/0030624 A1    Jan. 27, 2022

Related U.S. Application Data

(60) Provisional application No. 62/705,997, filed on Jul. 24, 2020.

(51) Int. Cl.
*H04W 74/08* (2009.01)
*H04W 52/04* (2009.01)
*H04W 72/56* (2023.01)

(52) U.S. Cl.
CPC ....... *H04W 74/0808* (2013.01); *H04W 52/04* (2013.01); *H04W 72/56* (2023.01)

(58) Field of Classification Search
CPC ............ H04W 74/0808; H04W 52/04; H04W 52/343; H04W 72/10; H04W 72/042; H04W 72/02; H04W 76/14; H04W 72/56; H04W 72/23; H04L 5/0094; H04L 5/0023; H04L 25/0242; H04L 25/0204
See application file for complete search history.

(56) References Cited

U.S. PATENT DOCUMENTS

| | | | |
|---|---|---|---|
| 2019/0053251 A1* | 2/2019 | Loehr | H04W 72/1263 |
| 2019/0373502 A1* | 12/2019 | Chae | H04W 72/12 |
| 2020/0045674 A1 | 2/2020 | Tseng et al. | |
| 2020/0187252 A1* | 6/2020 | Lee | H04B 17/3913 |
| 2020/0236654 A1 | 7/2020 | Hong et al. | |
| 2020/0413348 A1* | 12/2020 | Ryu | H04W 52/343 |

(Continued)

OTHER PUBLICATIONS

International Search Report and Written Opinion—PCT/US2021/070747—ISA/EPO—dated Oct. 29, 2021.

(Continued)

*Primary Examiner* — Ricardo H Castaneyra
(74) *Attorney, Agent, or Firm* — QUALCOMM Incorporated

(57) ABSTRACT

Various aspects of the present disclosure generally relate to wireless communication. In some aspects, a user equipment may receive a configuration indicating a resource pool and a channel occupancy control parameter for configured grant sidelink communications, select one or more resources from the resource pool based at least in part on the channel occupancy control parameter, and transmit a configured grant sidelink communication using the one or more resources from the resource pool. Numerous other aspects are provided.

28 Claims, 9 Drawing Sheets

(56) References Cited

U.S. PATENT DOCUMENTS

2022/0060929 A1* 2/2022 Hassan .............. H04W 72/085

OTHER PUBLICATIONS

OPPO: "Considerations on Congestion Control for NR-V2X," 3GPP Draft, 3GPP TSG RAN WG1 #96bis, R1-1904924 Congestion Control—KL, 3rd Generation Partnership Project (3GPP), Mobile Competence Centre, 650, Route Des Lucioles, F-06921, Sophia-Antipolis Cedex, France, vol. RAN WG1. No. Xi 'an. China, Apr. 8, 2019-Apr. 12, 2019, Apr. 2, 2019 (Apr. 2, 2019), XP051707345, 4 pages, Retrieved from the Internet: URL: http://www.3gpp.org/ftp/tsg%5Fran/WG1%5FRL1/TSGR1%5F96b/Docs/R1%2D1904924%2Ezip [retrieved on Apr. 2, 2019] section 2.1, section 2.2, section 3, Observation 1, Proposals 3-5.

Qualcomm Incorporated: "QoS Management and Congestion Control for Sidelink", 3GPP Draft, 3GPP TSG RAN WG1 Meeting #98, R1-1909258_QOA Management and Congestion Control for Sidelink, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 16, 2019 (Aug. 16, 2019), XP051765863, 3 pages, http://www.3gpp.org/ftp/tsg_ran/WG1_RL1/TSGR1_98/Docs/R1-1909258.zip [retrieved on Aug. 16, 2019], 2.1 Qos parameters usage, 2.2 Qos enforcement in resource allocation, 3.congestion control.

* cited by examiner

CONFIGURED GRANT SIDELINK COMMUNICATIONS

CROSS-REFERENCE TO RELATED APPLICATION

This patent application claims priority to U.S. Provisional Patent Application No. 62/705,997, filed on Jul. 24, 2020, entitled "CONFIGURED GRANT SIDELINK COMMUNICATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configured grant sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving a configuration indicating a resource pool and a channel occupancy control parameter for configured grant sidelink communications; selecting one or more resources from the resource pool based at least in part on the channel occupancy control parameter; and transmitting a configured grant sidelink communication using the one or more resources from the resource pool.

In some aspects, a method of wireless communication performed by a wireless communication device includes: determining a configuration for configured grant sidelink communications including a resource pool and a channel occupancy control parameter; and transmitting, to a UE, the configuration indicating the resource pool and the channel occupancy control parameter for configured grant sidelink communications.

In some aspects, a UE for wireless communication includes a memory and one or more processors coupled to the memory, the memory and the one or more processors configured to: receive a configuration indicating a resource pool and a channel occupancy control parameter for configured grant sidelink communications; select one or more resources from the resource pool based at least in part on the channel occupancy control parameter; and transmit a configured grant sidelink communication using the one or more resources from the resource pool.

In some aspects, a wireless communication device for wireless communication includes a memory and one or more processors coupled to the memory, the memory and the one or more processors configured to: determine a configuration for configured grant sidelink communications including a resource pool and a channel occupancy control parameter; and transmit, to a UE, the configuration indicating the resource pool and the channel occupancy control parameter for configured grant sidelink communications.

In some aspects, a non-transitory computer-readable medium storing a set of instructions for wireless communication includes: one or more instructions that, when executed by one or more processors of a UE, cause the UE to: receive a configuration indicating a resource pool and a channel occupancy control parameter for configured grant sidelink communications; select one or more resources from the resource pool based at least in part on the channel occupancy control parameter; and transmit a configured grant sidelink communication using the one or more resources from the resource pool.

In some aspects, a non-transitory computer-readable medium storing a set of instructions for wireless communication includes: one or more instructions that, when executed by one or more processors of a wireless communication device, cause the wireless communication device to: determine a configuration for configured grant sidelink communications including a resource pool and a channel occupancy control parameter; and transmit, to a UE, the configuration indicating the resource pool and the channel occupancy control parameter for configured grant sidelink communications.

In some aspects, an apparatus for wireless communication includes: means for receiving a configuration indicating a resource pool and a channel occupancy control parameter for configured grant sidelink communications; means for selecting one or more resources from the resource pool based at least in part on the channel occupancy control parameter; and means for transmitting a configured grant sidelink communication using the one or more resources from the resource pool.

In some aspects, an apparatus for wireless communication includes: means for determining a configuration for configured grant sidelink communications including a resource pool and a channel occupancy control parameter; and means for transmitting, to a UE, the configuration indicating the resource pool and the channel occupancy control parameter for configured grant sidelink communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of aspects according to the disclosure in order that the detailed description that follows may be better understood. Additional features and advantages will be described hereinafter. The conception and specific aspects disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some aspects, those skilled in the art will understand that such aspects may be implemented in many different arrangements and scenarios. Techniques described herein may be implemented using different platform types, devices, systems, shapes, sizes, and/or packaging arrangements. Some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. Transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. In some aspects, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
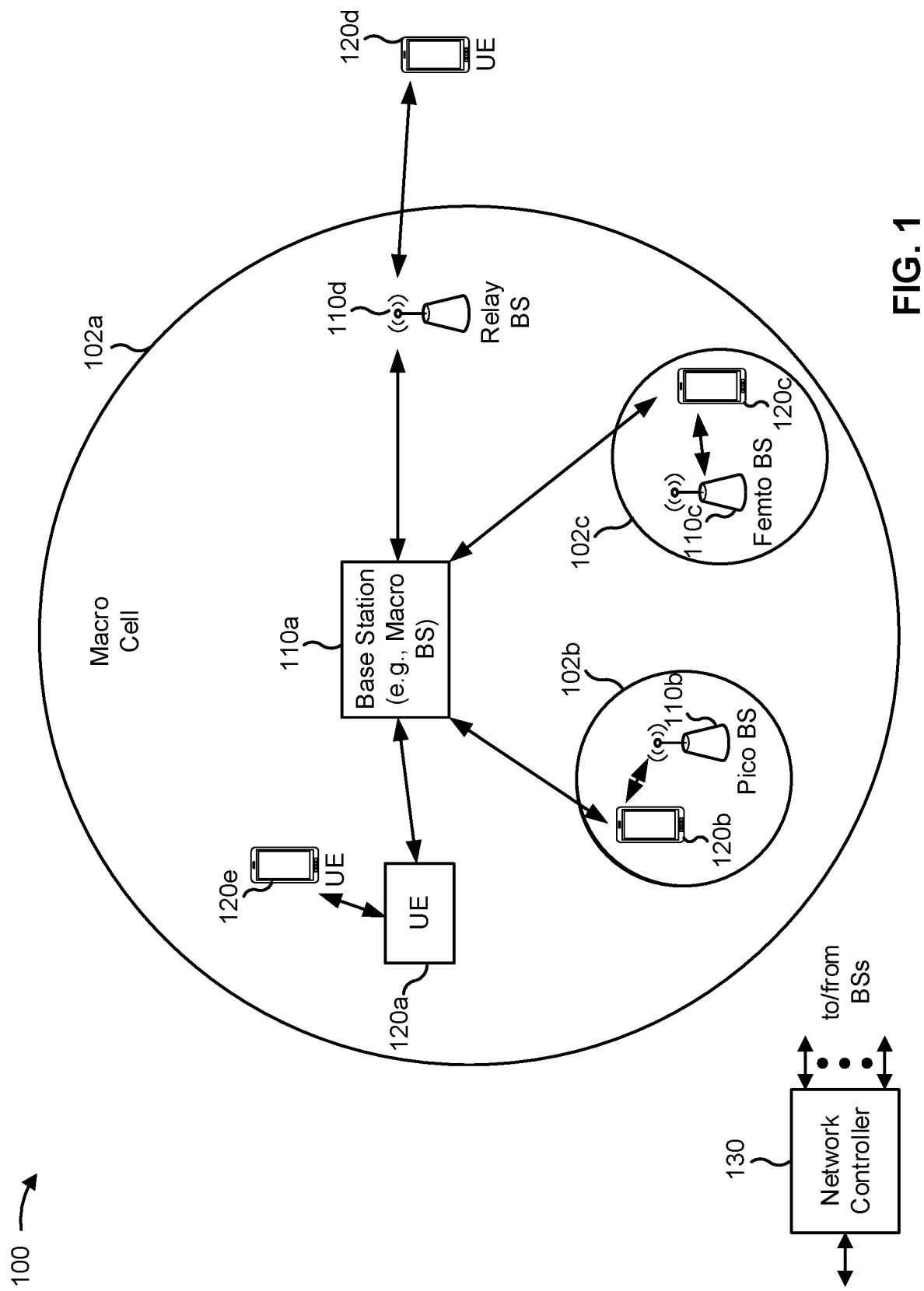
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. In some aspects, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, in some aspects, robots, drones, remote devices, sensors, meters, monitors, and/or location tags, that may communicate with a base station, another device (e.g., remote device), or some other entity. A wireless node may provide, in some aspects, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. In some aspects, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). In some aspects, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. In some aspects, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
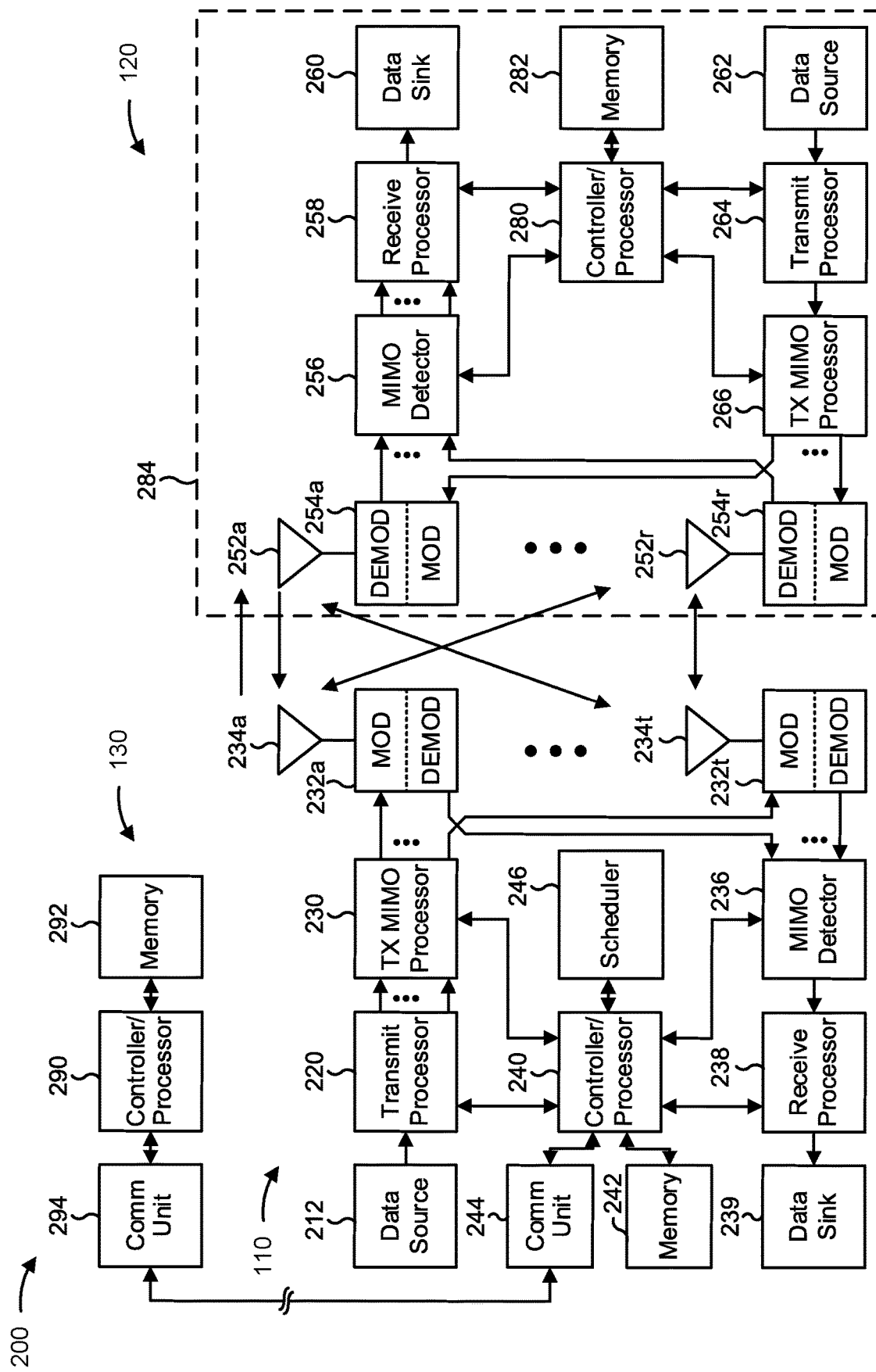
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, in some aspects, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the ULE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, in some aspects (such as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (such as described with reference to FIGS. 6-8).

Controller/processor 240 of base station 110, controller/processor 280 of UE 120, and/or any other component(s) of FIG. 2 may perform one or more techniques associated with configured grant sidelink communications, as described in more detail elsewhere herein. In some aspects, controller/processor 240 of base station 110, controller/processor 280 of UE 120, and/or any other component(s) of FIG. 2 may perform or direct operations of, in some aspects, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. In some aspects, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, in some aspects, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving a configuration indicating a resource pool and a channel occupancy control parameter for configured grant sidelink communications, means for selecting one or more resources from the resource pool based at least in part on the channel occupancy control parameter, means for transmitting a configured grant sidelink communication using the one or more resources from the resource pool, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a wireless communication device (e.g., a UE 120, a base station 110, and/or another device) may include means for determining a configuration for configured grant sidelink communications including a resource pool and a channel occupancy control parameter, means for transmitting, to a UE, the configuration indicating the resource pool and the channel occupancy control parameter for configured grant sidelink communications, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. In some aspects, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
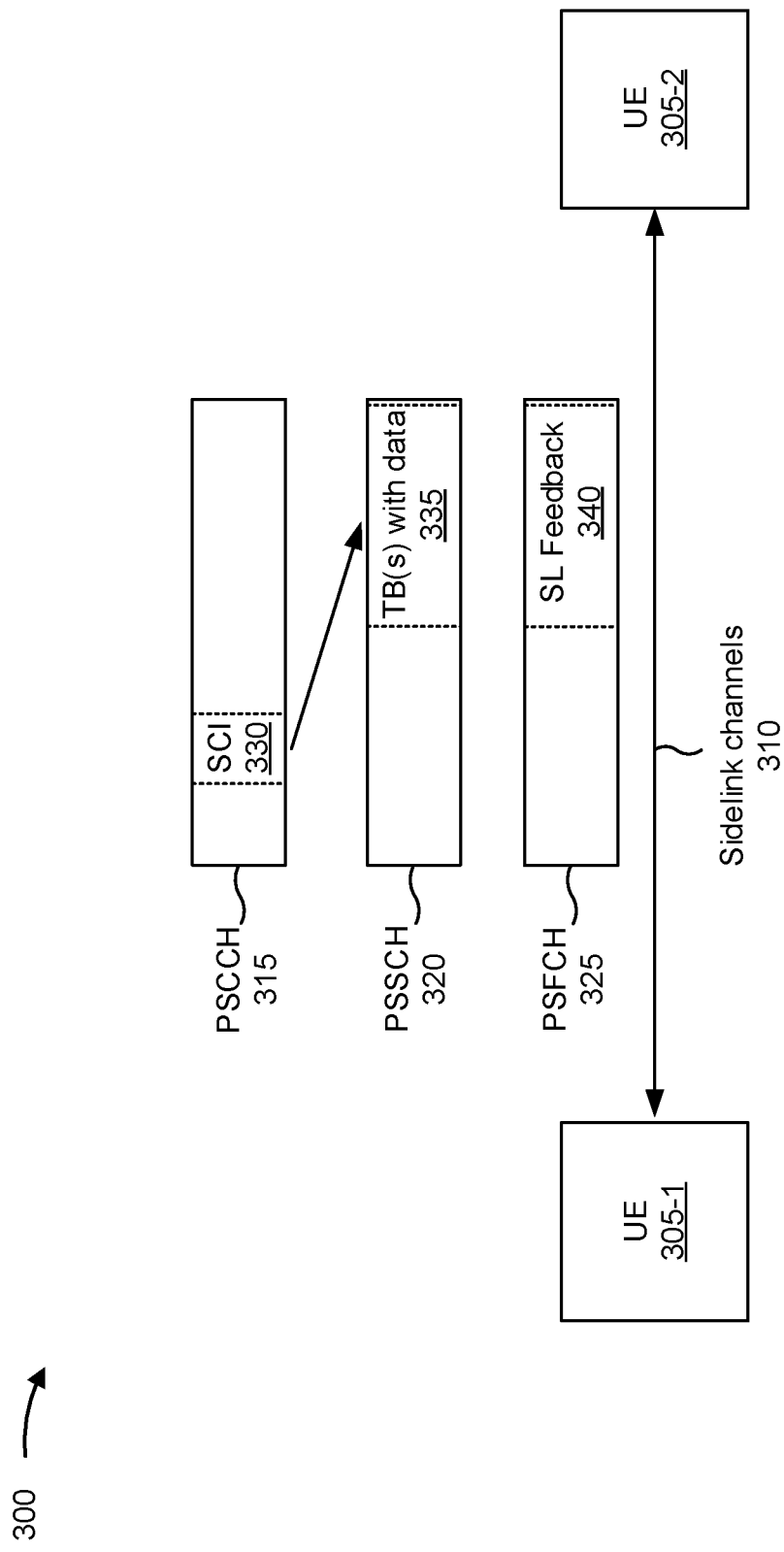
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. In some aspects, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. In some aspects, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
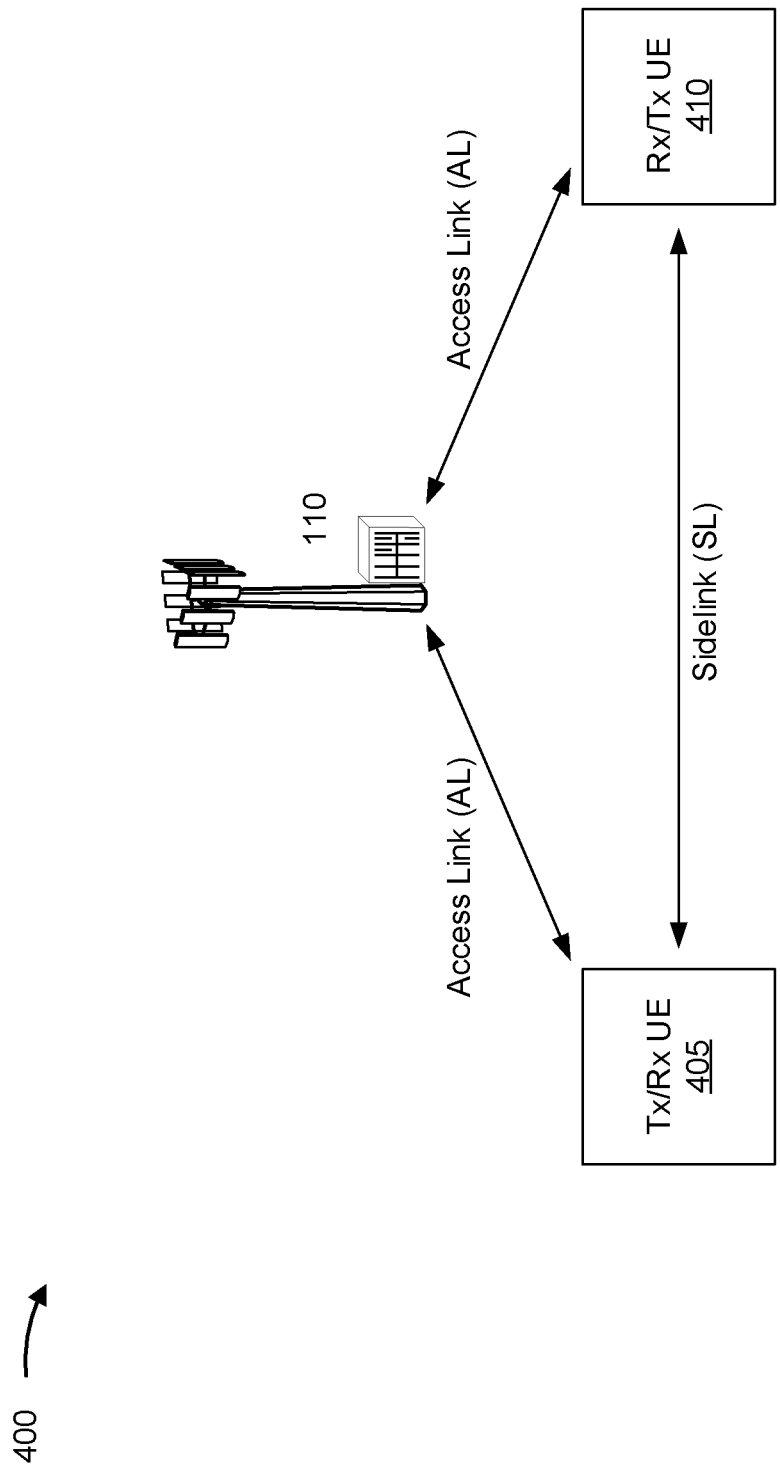
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
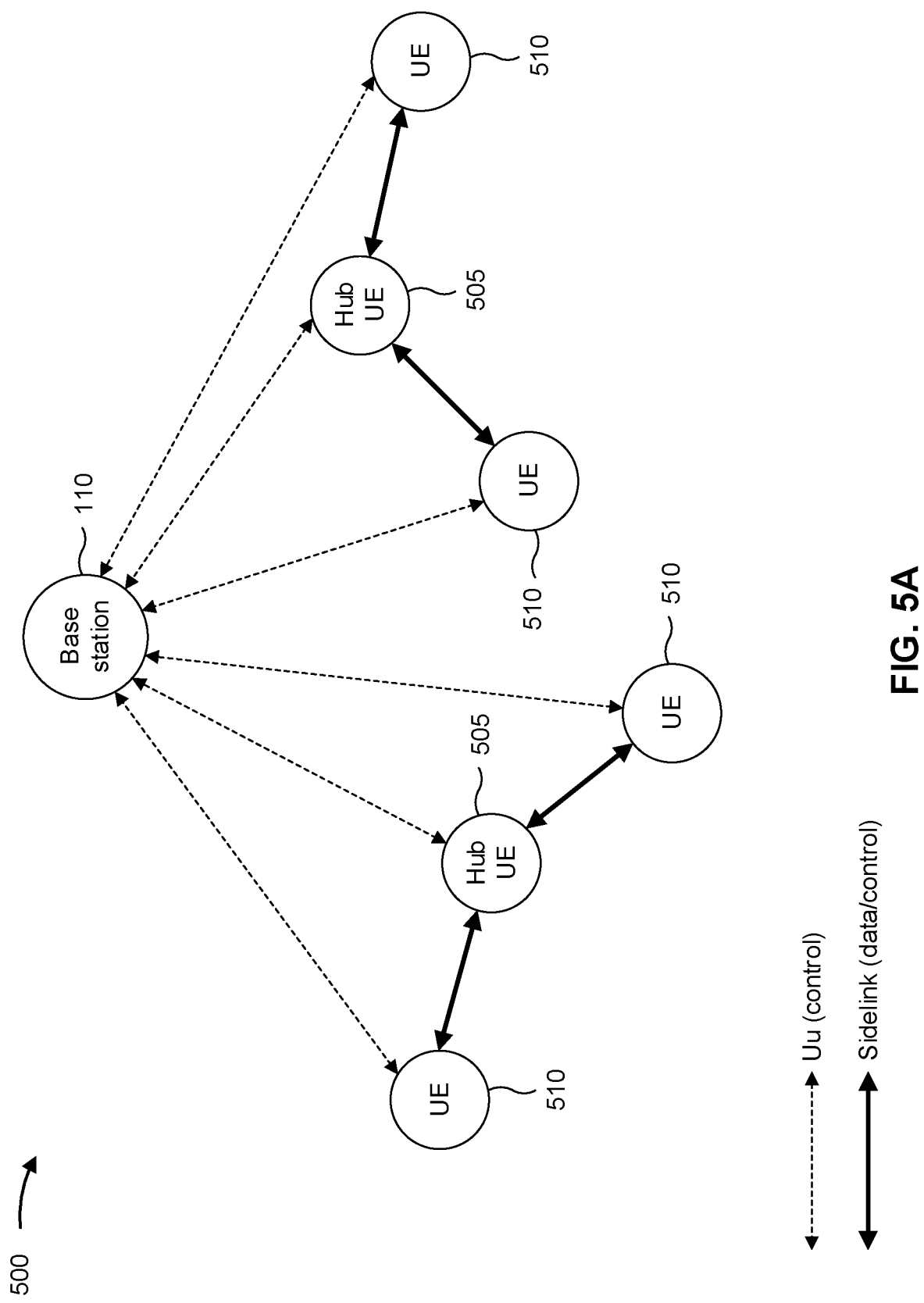
FIGS. 5A and 5B are diagrams illustrating examples of sidelink communications in a star topology network, in accordance with the present disclosure.
Figure 5B:
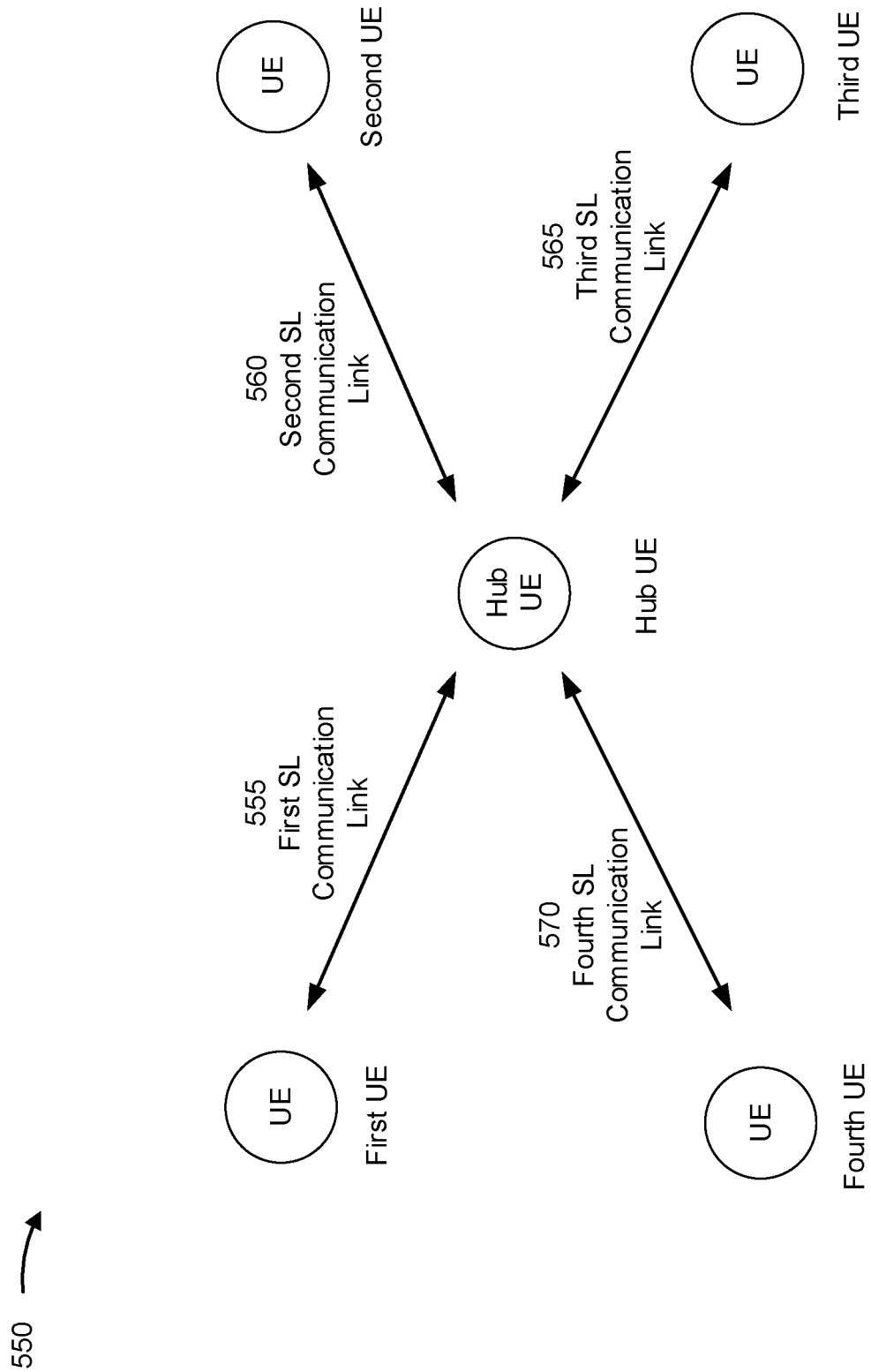

FIGS. 5A and 5B are diagrams illustrating examples 500 and 550 of sidelink communications in a star topology network, in accordance with the present disclosure.

As shown in FIG. 5A and example 500, a base station 110, one or more hub UEs 505, and one or more UEs 510 may communicate in a star topology network. The one or more hub UEs 505 may generate data to control operations of one or more UEs 510. In some aspects, the wireless network may include an industrial internet-of-things (IoT) environment. In some aspects, a hub UE 505 may be associated with a programmable logic controller (PLC) and the UEs 510 may be associated with a sensor/actuator device. A wirelessly connected hub UE 505 may be located close to factory equipment and/or devices (e.g., sensors/actuators). In some aspects, hub UEs 505 may be located close to UEs 510, whereas a base station 110 may be ceiling mounted or at a greater distance from the UEs 510. In some aspects, a majority of the communications within the star topology network may be sidelink communications (e.g., between a hub UE 505 and a UE 510, between two UEs 510, between two hub UEs 505, and/or the like).

As shown in FIG. 5A, a base station 110 may transmit scheduling information to hub UEs 505 and/or UEs 510 using direct links (e.g., Uu links). The scheduling information may include resource allocations for each communication between the hub UEs 510 and associated UEs 505. Alternatively, the scheduling information may include a resource allocation that the hub UEs 505 may use to allocate resources for individual communications between the hub UEs 505 and the associated UEs 510. As shown in FIG. 5A, a hub UE may communicate with the UEs 510 using direct communication links (e.g., one or more sidelinks).

In some aspects, the star topology network may utilize a Mode 1 channel access (e.g., where the base station 110 provides dynamic grants to the hub UEs 505 and/or the UEs 510 for sidelink communications). In some aspects, a transmitting UE (e.g., a hub UE 505 or a UE 510 that is requesting to transmit a sidelink communication) may request resources for a sidelink communication from the base station 110. During the resource request procedure, the base station 110 may allocate a sidelink radio network temporary identifier (SL-RNTI) to the transmitting UE. If this sidelink resource request is granted by the base station 110, then the base station 110 indicates the resource allocation for the PSCCH and the PSSCH in a downlink control information (DCI) conveyed by PDCCH scrambled with the SL-RNTI. When a transmitting UE receives such a DCI, the transmitting UE can obtain the grant only if the scrambled DCI can be successfully solved by the assigned SL-RNTI. A transmitting UE then indicates the time-frequency resources and the transmission scheme of the allocated PSSCH in the PSCCH, and launches the PSCCH and the PSSCH on the allocated resources for sidelink communications. When a grant is obtained from a gNB, a transmitting UE can only transmit a single transport block. However, allocating resources for sidelink communications in this manner requires significant signaling overhead, as described above.

In some aspects, the base station 110 may utilize configured grants (CGs) for scheduling and/or allocating resources for sidelink communications. In some aspects, prior to traffic arrival at a transmitting UE, the transmitting UE may perform a similar request procedure as described above with respect to dynamic grants and may request a set of resources. If a grant can be obtained from the base station 110, then the requested resources are reserved in a periodic manner. In some aspects, the base station 110 may configure the transmitting UE with periodic CG occasions (e.g., sidelink transmission opportunities). Each CG occasion may be associated with the resources granted by the base station 110 (e.g., specifying specific periodic slots in the time domain and/or specific sub-channels in the frequency domain for sidelink communications). Upon traffic arriving at a transmitting UE, the transmitting UE can transmit a PSCCH and/or a PSSCH in an upcoming CG occasion. The transmitting UE may report a CG sidelink transmission to the base station 110 to request a dynamic grant for retransmissions. Additionally or alternatively, the transmitting UE may report a CG sidelink transmission to the base station 110 such that the base station 110 may perform channel congestion control for the star topology network.

Utilizing CG resource allocation may reduce a signaling overhead for the star topology network. Additionally, the CG resource allocation may enable the base station 110 to coordinate channel access to avoid collisions of transmissions among the UEs that may occur based at least in part on using Mode 1 channel access or Mode 2 channel access (e.g., where a UE conducts sensing to autonomously occupy and/or reserve channel access before transmitting).

As shown in FIG. 5B and example 550, a first UE, a second UE, a third UE, and a fourth UE ("the UEs") communicate via a hub UE. Although illustrated as a UE, the hub may include any type of wireless computing device, such as a base station, a control node, a machine-type communication UE, and/or the like. In some aspects, the hub UE and the UEs may be out of a coverage area supported by a base station (e.g., the hub UE and the UEs may not be in a cell of a base station). In some aspects, the hub UE may be associated with a programmable logic controller (PLC) in an industrial IoT environment. The UEs may be associated with a device, such as a sensor/actuator in an industrial IoT environment. Although four UEs are shown in FIG. 5B, the hub UE may be associated with several tens of UEs. Similarly, while one star topology network is shown, a wireless network may include multiple star topology networks that operate in a similar manner as described herein.

As shown by reference numbers 555, 560, 565, and 570, a first sidelink communication link may facilitate communication between the first UE and the hub UE, a second sidelink communication link may facilitate communication between the second UE and the hub UE, a third sidelink communication link may facilitate communication between the third UE and the hub UE, and a fourth sidelink communication link may facilitate communication between the fourth UE and the hub UE. The UEs may communicate directly with the hub, may communicate with other UEs via the hub, may communicate directly with other UEs via a direct sidelink communication link, and/or the like.

In this way, the hub may perform control and/or scheduling processes for the UEs to improve scheduling conflicts between the UEs. However, many networks use protocols designed for peer-to-peer topology, which may be inefficient for a star topology network. In some aspects, a UE may use sensing (e.g., a listen-before-talk (LBT) protocol) to attempt to transmit control information (e.g., HARQ feedback) at a configured number of slots from a time of receiving a PSSCH communication. However, the channel may be occupied and the UE may be unable to transmit the control information. In another case, collisions of transmissions among the UEs may occur based at least in part on using Mode 2 channel access (e.g., where a UE conducts sensing to autonomously occupy and/or reserve channel access before transmitting). Additionally, or alternatively, Type 1 LBT-based inter-UE blocking may occur in an unlicensed band. Further, a UE may be forced to rely on blind retransmissions based at least in part on half-duplex deafness of the hub. In some aspects, the hub UE may communicate with one or more other hub UEs (e.g., associated with other star topology networks) to coordinate control and/or scheduling processes for the UEs to improve scheduling conflicts between the UEs.

Some networks are aware of a star topology and may use reserve-link scheduling via upper layer protocols over a physical layer or medium access control (MAC) layer of a network. In some aspects, the hub UE may announce the hub's designation as a hub in an application layer and use upper layer protocols to perform one or more control operations. The one or more control operations may include probing for traffic-related information from UEs, scheduling transmissions from multiple UEs without collisions (e.g., using upper layer based scheduling, such as radio network controller based scheduling in UMTS networks), scheduling wakeup timing for one or more of the UEs for power saving, and/or the like.

In some aspects, the hub UE may not be capable of controlling and/or scheduling the UEs using dynamic grants (e.g., scheduling communications based at least in part on a request from a UE). Rather, the hub UE may utilize CGs to coordinate sidelink communications within the star topology network. The hub UE may utilize CGs to coordinate sidelink communications in a similar manner as described above with respect to FIG. 5A. In some aspects, the hub UE may utilize CGs to coordinate reverse link data transmissions to avoid collisions of transmissions among the UEs that may occur based at least in part on using Mode 2 channel access.

As indicated above, FIGS. 5A and 5B are provided as examples. Other examples may differ from what is described with respect to FIGS. 5A and 5B.

Sidelink CGs for Mode 1 channel access (e.g., where a base station, a hub UE, and/or the like, grants the CGs to UEs for sidelink communications) may specific resources associated with the CGs. In some aspects, a sidelink transmitting UE may be configured with a CG that indicates a set of time-frequency resources for the sidelink transmitting UE to use for sidelink transmissions. The set of time-frequency resources may be per CG occasion. The CG occasions may be configured periodically (e.g., CG occasions may be configured to occur according to a periodic schedule). A sidelink transmitting UE may receive both time domain resources and frequency domain resources associated with the sidelink CG using radio resource control (RRC) signaling (e.g., from a base station, a hub UE, and/or the like). In some aspects, a sidelink transmitting UE may receive time domain resources associated with the sidelink CG using RRC signaling. The sidelink transmitting UE may receive frequency domain resources using downlink control information signaling that activates a specified frequency domain resource (e.g., a specific sub-channel, a set of RBs, and/or the like). In both cases, the resources allocated to the sidelink transmitting UE are specified such that the sidelink transmitting UE can only use the configured frequency domain resource(s) at the periodic slots (e.g., at the periodic CG occasions).

This manner of resource allocation for sidelink CGs is efficient when sidelink traffic follows a known or regular pattern. In some aspects, sidelink traffic may be deterministic in that a base station or a hub UE may know a periodicity or a pattern associated with the sidelink traffic. As a result, a sidelink transmitting UE can be configured with resources and CG occasions that align with the known or regular pattern associated with the sidelink traffic. However, if sidelink traffic is un-deterministic or does not follow a known or regular pattern, the above manner of resource allocation for sidelink CGs may be insufficient. In some aspects, where un-deterministic sidelink traffic is associated with non-trivial latency requirements, the sidelink transmitting UE may require more time-frequency resources per CG occasion to satisfy the non-trivial latency requirements. However, the increased time-frequency resources per CG occasion may result in increased channel congestion within the wireless network. As a result, a quality of service (QoS) may be negatively impacted, as the increased channel congestions may reduce a data rate, reduce throughput, increase delay, reduce capacity, increase packet-loss, and/or the like within the wireless network.

Some techniques and apparatuses described herein enable sidelink CGs that indicate a resource pool and a channel occupancy control parameter for CG sidelink communications. In some aspects, a sidelink transmitting UE may receive the configuration for the sidelink CG indicating the resource pool per CG occasion. The sidelink transmitting UE may determine a local channel occupancy status and select resources from the resources for sidelink transmissions based at least in part on comparing the local channel occupancy status to the channel occupancy control parameter. In this way, the sidelink transmitting UE may use a relatively large amount of resources if sidelink traffic is following an assumed or known traffic pattern. Additionally, the sidelink transmitting UE is enabled to regulate the sidelink transmitting UE's channel access if sidelink traffic is not following an assumed or known traffic pattern or if the sidelink transmitting UE determines a high local channel occupancy status. As a result, a QoS for the wireless network is improved where sidelink traffic does not follow known or regular patterns and is associated with non-trivial latency requirements, as the sidelink transmitting UE may have a larger pool of resources to select for sidelink transmissions within the bounds of the channel occupancy control parameter. Further, as the sidelink transmitting UE may regulate its own channel access, a signaling overhead between the sidelink transmitting UE and a base station or other UE associated with channel congestion control is reduced.

Figure 6:
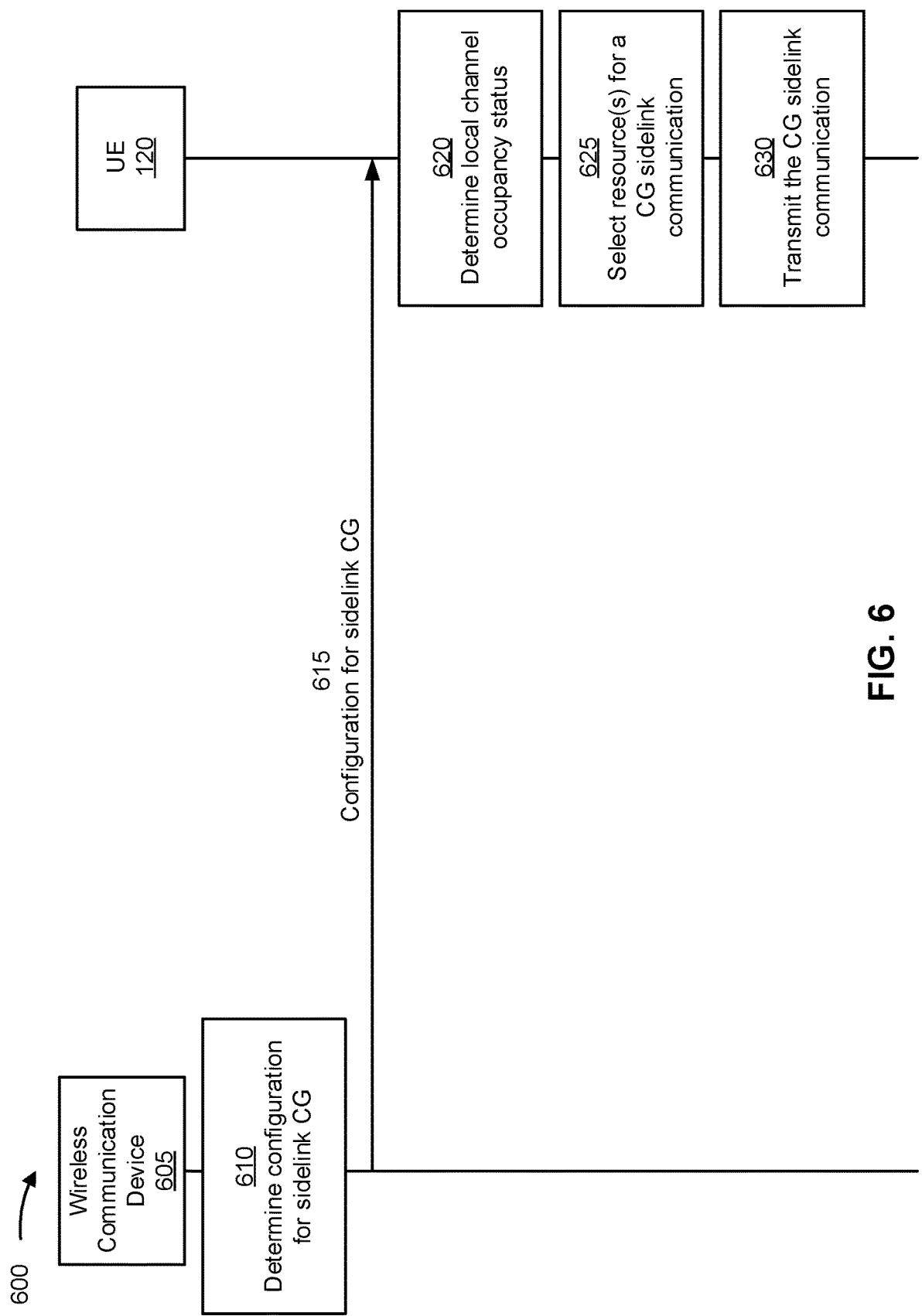
FIG. 6 is a diagram illustrating an example associated with configured grant sidelink communications, in accordance with the present disclosure.

FIG. 6 is a diagram illustrating an example 600 associated with configured grant sidelink communications, in accordance with the present disclosure. As shown in FIG. 6, a wireless communication device (WCD) 605 (e.g., a UE 120, a base station 110, and/or the like) may communicate with one or more UEs 120 (e.g., UE 120). The WCD 605 and the one or more UEs 120 may be part of a wireless network (e.g., wireless network 100). In some aspects, the WCD 605 may be configured to operate as a hub for the one or more UEs 120 within the network (e.g., as described above with respect to FIGS. 5A and 5B). In some aspects, the WCD 605 may be a base station 110 as described above with respect to FIG. 5A. In some aspects, the WCD 605 may be a hub UE as described above with respect to FIG. 5B.

As shown by reference number 610, the WCD 605 may determine a configuration for CG sidelink communications to be transmitted by the UE 120. The configuration for CG sidelink communications may indicate a resource pool and a channel occupancy control parameter. The resource pool may be a set of resources (e.g., one or more resources) associated with CG occasions indicated by the configuration for CG sidelink communications. In some aspects, the resource pool may be a set of resources per CG occasion available to the UE 120 for sidelink transmissions. The resource pool may include one or more slots in the time domain and one or more sub-channels in the frequency domain. A sub-channel may be a set of contiguous RBs (e.g., 10 RBs and/or the like). The WCD 605 may determine the one or more slots and the one or more sub-channels that are to be included in the resource pool. In some aspects, the one or more sub-channels included in the resource pool may be contiguous in the frequency domain. In some aspects, the one or more sub-channels included in the resource pool may be non-contiguous in the frequency domain (e.g., there may be one or more gaps of one or more non-allocated sub-channels within the resource pool). In some aspects, the resource pool may include only a single resource (e.g., only a single slot and/or sub-channel) available for the UE 120.

In some aspects, the WCD 605 may determine multiple resource pools associated with CG occasions. In some aspects, the WCD 605 may determine that each CG occasion is associated with multiple resource pools. In some aspects, the multiple resource pools may occupy the same time domain resources. In some aspects, the multiple resource pools may occupy contiguous frequency domain resources. In some aspects, the multiple resource pools may occupy non-contiguous frequency domain resources (e.g., there may be a gap of non-allocated frequency domain resources between resource pools).

In some aspects, one or more resource pools of the multiple resource pools may be associated with the UE 120 exclusively (e.g., is to be used only by the UE 120). In some aspects, one or more resource pools of the multiple resource pools are shared among multiple UEs 120. The WCD 605 may determine that the one or more resource pools of the multiple resource pools associated with the UE 120 exclusively may be associated with a first transmit power. The WCD 605 may determine that the one or more resource pools of the multiple resource pools that are shared among multiple UEs 120 may be associated with a second transmit power. In some aspects, the first transmit power may be lower than the second transmit power. In some aspects, the configuration for CG sidelink communications may indicate that the UE 120 is to use resources included in the one or more resource pools of the multiple resource pools that are shared among multiple UEs 120 only after using all transmission opportunities in the one or more resource pools of the multiple resource pools associated with the UE 120 exclusively. That is, the one or more resource pools of the multiple resource pools associated with the UE 120 exclusively may be associated with a higher priority for CG sidelink communications than the one or more resource pools of the multiple resource pools that are shared among multiple UEs 120.

In some aspects, the WCD 605 may determine a set of preference parameters associated with a set of resources included in the resource pool. In some aspects, the WCD 605 may determine a preferred probability of occupancy, for a configured grant sidelink communication using the resource pool, in the time domain, the frequency domain, and/or the spatial domain. In some aspects, the WCD 605 may determine a preference parameter corresponding to a slot index, a preference parameter corresponding to a sub-channel index, and/or the like. A preference parameter may indicate to the UE 120 a weight or a preference for certain resources within the resource pool. In some aspects, the WCD 605 may determine that the UE 120 should use one or more sub-channels more frequently than one or more other sub-channels within the resource pool. The one or more sub-channels that the UE 120 is to use more frequently may be associated with a higher preference parameter than the one or more other sub-channels within the resource pool.

As described above, a CG occasion may be a sidelink transmission opportunity for the UE 120 (e.g., the UE 120 may transmit sidelink communications using resources associated with the CG occasion during the CG occasion). The WCD 605 may determine a periodicity associated with CG occasions. In some aspects, the WCD 605 may determine that CG occasions are to occur every T slots, where T is greater than or equal to 1. In some aspects, the WCD 605 may determine a periodicity of CG occasions in terms of a quantity of symbols (e.g., OFDM symbols), in terms of an amount of time (e.g., that CG occasions are to occur every N ms and/or the like), and/or the like. The configuration for CG sidelink communications may indicate the periodicity associated with CG occasions.

The WCD 605 may determine a transmit power control setup for the UE 120 associated with the configuration for CG sidelink communications. In some aspects, the WCD 605 may determine that the UE 120 is to use an open loop power control configuration for CG sidelink communications with the WCD 605 (e.g., where the WCD 605 is a UE 120). In some aspects, the WCD 605 may determine that the UE 120 is to use an open loop power control configuration for CG sidelink communications with the WCD 605 and one or more other UEs 120. In some aspects, the WCD 605 may determine that the UE 120 is to use a fractional power control configuration that is based at least in part on a fractional power control configuration associated with a different radio access technology (RAT) than the RAT associated with the CG sidelink communications. In some aspects, the WCD 605 may configure the UE 120 to use a fractional power control configuration inherited from an LTE RAT with one or more changed parameters (e.g., with a different alpha value and/or the like). The transmit power control setup may be dynamically indicated to the UE 120 (e.g., using Layer 1 control signaling, such as DCI signaling).

The WCD 605 may determine a channel occupancy control parameter associated with configured grant sidelink communications to be transmitted by the UE 120. The channel occupancy control parameter may indicate a channel occupancy limit, such as a quantity of sub-channels that the UE 120 is permitted to use within a quantity of consecutive CG occasions. In some aspects, the channel occupancy control parameter may be a channel occupancy ratio control parameter (e.g., indicating an allowable ratio of a quantity of sub-channels used by the UE 120 to a total quantity of sub-channels available to the UE 120). The channel occupancy control parameter may enable the UE 120 to regulate channel access by the UE 120 to avoid channel congestion within the wireless network, as described in more detail below.

In some aspects, the channel occupancy control parameter may be based at least in part on a CBR estimate that is to be determined by the UE 120. In some aspects, the WCD 605 may determine a CBR estimation pool. The CBR estimation pool may include a set of resource pools. In some aspects, the CBR estimation pool may include the resource pool indicated by the configuration for CG sidelink communications (e.g., the resource pool associated with the UE 120) and one or more other resource pools associated with one or more other UEs 120. In some aspects, the WCD 605 may determine the one or more other resource pools to be included in the CBR estimation pool based at least in part on determining that the one or more other resource pools overlap with the resource pool associated with the UE 120 (e.g., overlap in the time domain, overlap in the frequency domain, and/or overlap in the spatial domain).

The WCD 605 may determine a mapping of CBR values to channel occupancy limits. A channel occupancy limit may indicate a quantity of sub-channels that the UE 120 is permitted to use within a quantity of consecutive CG occasions. The WCD 605 may transmit an indication of the mapping of CBR values to channel occupancy limits with the configuration for CG sidelink communications. In some aspects, the WCD 605 may transmit an indication of the mapping of CBR values to channel occupancy limits in another communication, such as in a system information block (SIB), in an RRC communication, and/or the like.

As shown by reference number 615, the WCD 605 may transmit the configuration for sidelink CG communications to the UE 120. The WCD 605 may transmit the configuration for sidelink CG communications using RRC signaling, medium access control (MAC) control element (MAC-CE) signaling, DCI signaling, and/or the like.

In some aspects, the WCD 605 may transmit the configuration for sidelink CG communications indicating the resource pool, the channel occupancy control parameter, the periodicity associated with CG occasions, and/or the like using Layer 3 signaling. In some aspects, if the WCD 605 is a base station 110, the Layer 3 signaling may include an RRC communication via a Uu link between the WCD 605 and the UE 120. If the WCD 605 is a UE 120 (e.g., a hub UE), the Layer 3 signaling may include a sidelink RRC communication via a PC5 link between the WCD 605 and the UE 120.

In some aspects, the WCD 605 may transmit the configuration for sidelink CG communications indicating the resource pool, the channel occupancy control parameter, the periodicity associated with CG occasions, and/or the like using a combination of Layer 3 signaling and Layer 1 signaling. In some aspects, the WCD 605 may indicate frequency domain resources to be included in the resource pool using dynamic Layer 1 signaling. If the WCD 605 is a base station 110, the Layer 1 signaling may include a DCI communication (e.g., a DCI communication using a DCI format 3_0 and/or the like) via a Uu link between the WCD 605 and the UE 120. If the WCD 605 is a UE 120, the Layer 1 signaling may include an SCI communication via a PC5 link between the WCD 605 and the UE 120. The UE 120 may receive the configuration for sidelink CG communications and identify the resource pool, the channel occupancy control parameter, the periodicity associated with CG occasions, and/or the like.

As shown by reference number 620, the UE 120 may determine a local channel occupancy status at the UE 120. In some aspects, the UE 120 may determine that the UE 120 has sidelink traffic that is to be communicated. To select resources from the resource pool during a CG occasion, the UE 120 may first determine the local channel occupancy status of the UE 120. The local channel occupancy status may be a quantity of sub-channels used by the UE 120 over a quantity of previous CG occasions (e.g., the quantity of previous CG occasions indicated by the WCD 605). The UE 120 may determine a channel occupancy limit based at least in part on the channel occupancy control parameter indicated by the configuration for sidelink CG communications. In some aspects, the channel occupancy control parameter may indicate the channel occupancy limit (e.g., a quantity of sub-channels that the UE 120 is permitted to use over the quantity of previous CG occasions).

In some aspects, the channel occupancy control parameter may indicate a CBR estimation pool, as described above. The UE 120 may determine a CBR of the CBR estimation pool. The UE 120 may determine the channel occupancy limit based at least in part on a mapping of CBR values to channel occupancy limits (e.g., indicated by the WCD 605, as described above).

In some aspects, the channel occupancy control parameter may indicate a sidelink transmit resource pool that the UE 120 is to use as the CBR estimation pool. The sidelink transmit resource pool may be all resources available for sidelink communication within the wireless network (e.g., sl-TxPoolScheduling and/or the like). The UE 120 may determine a channel occupancy limit in a similar manner to Mode 2 channel access described above with respect to FIGS. 5A and 5B. The UE 120 may determine a local channel occupancy status of the UE 120 in a similar manner to Mode 2 channel access (e.g., considering scheduled channel use). The UE 120 may determine a channel occupancy headroom value based at least in part on a difference between the channel occupancy limit and the local channel occupancy status associated with the resource pool. In other words, the CG occasion may be conditioned on, associated with, or based at least in part on, the channel occupancy control parameter, as described in more detail elsewhere herein.

In some aspects, the configuration for the CG sidelink communications may indicate that the resource pool is the sidelink transmit resource pool. The UE 120 may determine a CBR for the sidelink transmit resource pool. The UE 120 may determine a channel occupancy limit based at least in part on the CBR for the sidelink transmit resource pool. The UE 120 may determine a channel occupancy value associated with the sidelink transmit resource pool based at least in part on scheduled channel use. The UE 120 may determine a channel occupancy headroom value based at least in part on a difference between the channel occupancy limit and the channel occupancy value associated with the sidelink transmit resource pool.

In some aspects, the UE 120 may receive a dynamic channel occupancy command from the WCD 605 indicating a channel occupancy limit. In some aspects, the WCD 605 may transmit the dynamic channel occupancy command based at least in part on channel conditions, channel congestion, and/or the like within the wireless network. The dynamic channel occupancy command may indicate an updated or a new channel occupancy limit to be used by the UE 120.

As shown by reference number 625, the UE 120 may select resource(s) for a CG sidelink communication based at least in part on the channel occupancy control parameter. In other words, the UE 120 may use the CG occasion based at least in part on the channel occupancy control parameter. In some aspects, the UE 120 may determine a difference between a channel occupancy limit and the local channel occupancy status. The UE 120 may select resources for the CG sidelink communication in an upcoming CG occasion such that the local channel occupancy status does not exceed the channel occupancy limit. If the UE 120 determines that the local channel occupancy status is lower than the channel occupancy limit, the UE 120 may select more resources in the upcoming CG occasion for CG sidelink communications. If the UE 120 determines that the local channel occupancy status is near the channel occupancy limit, the UE 120 may select fewer resources in the upcoming CG occasion for CG sidelink communications. If the UE 120 determines that the local channel occupancy status is greater than or equal to the channel occupancy limit, the UE 120 may determine that the UE 120 cannot transmit any sidelink communications in the upcoming CG occasion. In some aspects, the resource pool and/or the CG occasion may be associated with a single resource (e.g., a single time domain resource and/or frequency domain resource). The UE 120 may select the single resource if selecting the single resource does not cause the local channel occupancy status to exceed the channel occupancy limit.

In some aspects, the UE 120 may select one or more resources from the resource pool if the quantity of resources used by the UE 120 for CG sidelink communications during a quantity of consecutive CG occasions is less than the channel occupancy limit. As described above, the channel occupancy limit may be indicated by the channel occupancy control parameter, may be determined by the UE 120 based at least in part on a CBR value determined by the UE 120, and/or the like.

In some aspects, the UE 120 may select one or more resources for the CG sidelink communication based at least in part on the channel occupancy headroom value determined by the UE 120. In some aspects, the channel occupancy headroom value may indicate a quantity of resources available for the UE 120 for the CG sidelink communication. The UE 120 may select one or more resources up to the quantity of resources available for the UE 120 for the CG sidelink communication indicated by the channel occupancy headroom value.

In some aspects, the UE 120 may select one or more resources for the CG sidelink communication based at least in part on a set of preference parameters indicated by the WCD 605, as described above. In some aspects, the UE 120 may select one or more resources for the sidelink CG communication based at least in part on a first resource pool being associated with a higher priority for CG sidelink communications than a priority associated with a second resource pool (e.g., where the configuration for CG sidelink communications indicates that each CG occasion is associated with multiple resource pools).

In some aspects, the UE 120 may be configured with a channel occupancy weighting matrix associated with the set of resources included in the resource pool. The channel occupancy weighting matrix may be indicated in the configuration for sidelink CG communications. The channel occupancy weighting matrix may indicate one or more channel occupancy weights corresponding to one or more slot indexes, one or more channel occupancy weights corresponding to one or more sub-channel indexes, and/or the like. When selecting resources to use for the CG sidelink communication, the UE 120 may use the channel occupancy weights when determining whether the selected resources will cause the UE 120 to exceed the channel occupancy limit. In some aspects, a sub-channel index may be associated with a channel occupancy weight of 2. As a result, when determining the local channel occupancy status of the UE 120, if the UE 120 selects resources included in the sub-channel indicated by the sub-channel index, those resources will count twice as much as normal towards the channel occupancy status. In this way, the WCD 605 may indicate a preference for certain resources included in the resource pool by associating other resources with a higher channel occupancy weight. As a result, the UE 120 may select the resources associated with a lower channel occupancy weight more often than the resources associated with a higher channel occupancy weight (e.g., so that the UE 120 ensures that the UE 120 does not exceed the channel occupancy limit).

The UE 120 may select any resources included in the resource pool, so long as the selected resources do not cause the local channel occupancy of the UE 120 to exceed the channel occupancy limit. In this way, the UE 120 may have flexibility in which resources the UE 120 selects and the quantity of resources that the UE 120 selects during different CG occasions. In some aspects, in a first CG occasion, the UE 120 may select a first quantity of resources from the resource pool for a first CG sidelink communication. In a second CG occasion, the UE 120 may select a second quantity of resources from the resource pool for a second CG sidelink communication.

As shown by reference number 630, the UE 120 may transmit a CG sidelink communication during the CG occasion using the resources selected by the UE 120. In some aspects, the UE 120 may transmit the CG sidelink communication to the WCD 605 (e.g., when the WCD 605 is a UE 120). In some aspects, the UE 120 may transmit the CG sidelink communication to one or more other UEs 120. In some aspects, the UE 120 may transmit multiple transport blocks (TBs) during the CG occasion using the resources selected by the UE 120. The UE 120 may transmit the CG sidelink communication using the transmit power control setup indicated by the WCD 605.

As a result, a QoS for the wireless network is improved where sidelink traffic does not follow known or regular patterns and is associated with non-trivial latency requirements, as the UE 120 may have a larger pool of resources to select for CG sidelink transmissions within the bounds of the channel occupancy control parameter. Further, as the UE 120 may regulate its own channel access, a signaling overhead between the UE 120 and WCD 605 associated with channel congestion control is reduced.

As indicated above, FIG. 6 is provided as an example. Other examples may differ from what is described with respect to FIG. 6.

Figure 7:
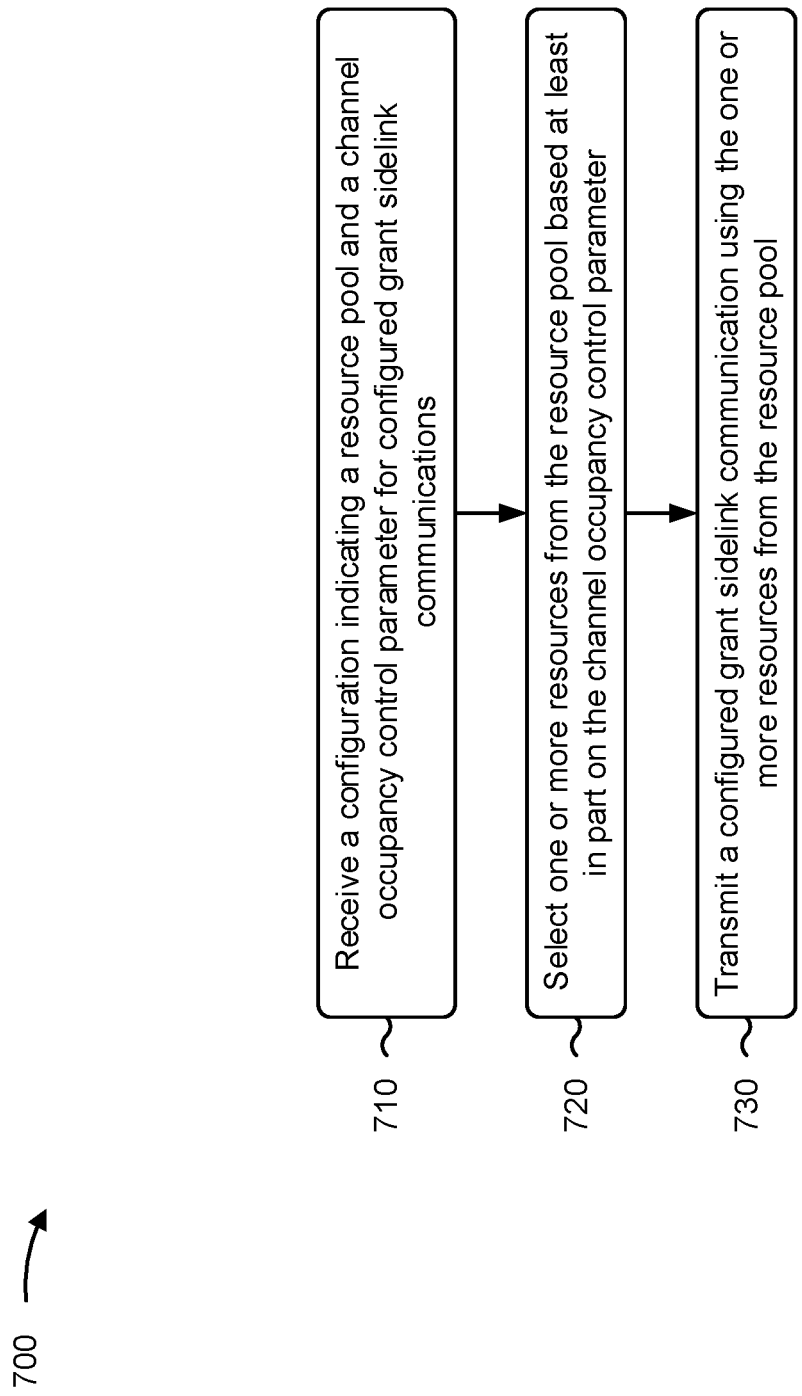
FIGS. 7-8 are diagrams illustrating example processes associated with configured grant sidelink communications, in accordance with the present disclosure.

FIG. 7 is a diagram illustrating an example process 700 performed, in some aspects, by a UE, in accordance with the present disclosure. Example process 700 is an example where the UE (e.g., UE 120) performs operations associated with configured grant sidelink communications.

As shown in FIG. 7, in some aspects, process 700 may include receiving a configuration indicating a resource pool and a channel occupancy control parameter for configured grant sidelink communications (block 710). In some aspects, the UE (e.g., using antenna 252, demodulator 254, MIMO detector 256, receive processor 258, controller/processor 280, and/or memory 282) may receive a configuration indicating a resource pool and a channel occupancy control parameter for configured grant sidelink communications, as described above.

As further shown in FIG. 7, in some aspects, process 700 may include selecting one or more resources from the resource pool based at least in part on the channel occupancy control parameter (block 720). In some aspects, the UE (e.g., using antenna 252, demodulator 254, MIMO detector 256, receive processor 258, transmit processor 264, TX MIMO processor 266, modulator 254, controller/processor 280, and/or memory 282) may select one or more resources from the resource pool based at least in part on the channel occupancy control parameter, as described above.

As further shown in FIG. 7, in some aspects, process 700 may include transmitting a configured grant sidelink communication using the one or more resources from the resource pool (block 730). In some aspects, the UE (e.g., using antenna 252, transmit processor 264, TX MIMO processor 266, modulator 254, controller/processor 280, and/or memory 282) may transmit a configured grant sidelink communication using the one or more resources from the resource pool, as described above.

Process 700 may include additional aspects, such as any single aspect or any combination of aspects described below and/or in connection with one or more other processes described elsewhere herein.

In a first aspect, the resource pool indicates a set of resources per configured grant occasion.

In a second aspect, alone or in combination with the first aspect, receiving the configuration indicating the resource pool and the channel occupancy control parameter for configured grant sidelink communications comprises receiving a configuration indicating a periodic schedule for configured grant occasions for configured grant sidelink communications.

In a third aspect, alone or in combination with one or more of the first and second aspects, the resource pool indicates a plurality of slots in a time domain and a plurality of sub-channels in a frequency domain.

In a fourth aspect, alone or in combination with one or more of the first through third aspects, receiving the configuration indicating the resource pool and the channel occupancy control parameter for configured grant sidelink communications comprises receiving the configuration indicating a transmit power control setup for configured grant sidelink communications.

In a fifth aspect, alone or in combination with one or more of the first through fourth aspects, transmitting the configured grant sidelink communication using the one or more resources from the resource pool comprises transmitting a plurality of transport blocks associated with the configured grant sidelink communication in a single configured grant occasion.

In a sixth aspect, alone or in combination with one or more of the first through fifth aspects, selecting the one or more resources from the resource pool based at least in part on the channel occupancy control parameter comprises determining a quantity of sub-channels used by the UE in a quantity of consecutive configured grant occasions, comparing the quantity of sub-channels used by the UE in the quantity of consecutive configured grant occasions to the channel occupancy control parameter, wherein the channel occupancy control parameter indicates a maximum quantity of sub-channels that can be used by the UE in the quantity of consecutive configured grant occasions, and selecting one or more resources from the resource pool based at least in part on comparing the quantity of sub-channels used by the UE in the quantity of consecutive configured grant occasions to the channel occupancy control parameter.

In a seventh aspect, alone or in combination with one or more of the first through sixth aspects, the channel occupancy control parameter is a channel occupancy ratio control parameter.

In an eighth aspect, alone or in combination with one or more of the first through seventh aspects, receiving the configuration indicating the resource pool and the channel occupancy control parameter for configured grant sidelink communications comprises receiving the configuration using Layer 3 signaling.

In a ninth aspect, alone or in combination with one or more of the first through eighth aspects, receiving the configuration using Layer 3 signaling comprises receiving, from a base station, a radio resource control signal indicating the configuration.

In a tenth aspect, alone or in combination with one or more of the first through ninth aspects, receiving the configuration using Layer 3 signaling comprises receiving, from another UE, a sidelink radio resource control signal indicating the configuration.

In an eleventh aspect, alone or in combination with one or more of the first through tenth aspects, receiving the configuration indicating the resource pool and the channel occupancy control parameter for configured grant sidelink communications comprises receiving a Layer 3 signal indicating a time domain resource allocation for the resource pool, and receiving a dynamic Layer 1 signal indicating a frequency domain resource allocation for the resource pool.

In a twelfth aspect, alone or in combination with one or more of the first through eleventh aspects, receiving the dynamic Layer 1 signal indicating the frequency domain resource allocation for the resource pool comprises receiving, from a base station, a downlink control information communication indicating the frequency domain resource allocation for the resource pool.

In a thirteenth aspect, alone or in combination with one or more of the first through twelfth aspects, receiving the dynamic Layer 1 signal indicating the frequency domain resource allocation for the resource pool comprises receiving, from another UE, a sidelink control information communication indicating the frequency domain resource allocation for the resource pool.

In a fourteenth aspect, alone or in combination with one or more of the first through thirteenth aspects, receiving the dynamic Layer 1 signal indicating the frequency domain resource allocation for the resource pool comprises receiving, from a wireless communication device, the dynamic Layer 1 signal indicating a transmit power control setup for configured grant sidelink communications.

In a fifteenth aspect, alone or in combination with one or more of the first through fourteenth aspects, the transmit power control setup indicates an open loop power control configuration to be used for configured grant sidelink communications with the wireless communication device or one or more other UEs.

In a sixteenth aspect, alone or in combination with one or more of the first through fifteenth aspects, the transmit power control setup indicates a fractional power control configuration that is based at least in part on a fractional power control configuration associated with a different radio access technology than a radio access technology associated with the configured grant sidelink communications.

In a seventeenth aspect, alone or in combination with one or more of the first through sixteenth aspects, the channel occupancy control parameter indicates a channel occupancy limit for configured grant sidelink communications using resources included in the resource pool over a quantity of consecutive configured grant occasions.

In an eighteenth aspect, alone or in combination with one or more of the first through seventeenth aspects, selecting the one or more resources from the resource pool based at least in part on the channel occupancy control parameter comprises determining a quantity of resources used by the UE for configured grant sidelink communications during the quantity of consecutive configured grant occasions, comparing the quantity of resources used by the UE for configured grant sidelink communications during the quantity of consecutive configured grant occasions to the channel occupancy limit, and selecting one or more resources from the resource pool if the quantity of resources used by the UE for configured grant sidelink communications during the quantity of consecutive configured grant occasions is less than the channel occupancy limit.

In a nineteenth aspect, alone or in combination with one or more of the first through eighteenth aspects, receiving the configuration indicating the resource pool and the channel occupancy control parameter for configured grant sidelink communications comprises receiving the configuration indicating a channel busy ratio (CBR) estimation pool.

In a twentieth aspect, alone or in combination with one or more of the first through nineteenth aspects, the CBR estimation pool comprises the resource pool and one or more other resource pools associated with one or more other configurations for configured grant sidelink communications of other UEs.

In a twenty-first aspect, alone or in combination with one or more of the first through twentieth aspects, the one or more other resource pools overlap with the resource pool in a time domain, a frequency domain, a spatial domain, or a combination thereof.

In a twenty-second aspect, alone or in combination with one or more of the first through twenty-first aspects, receiving the configuration indicating the resource pool and the channel occupancy control parameter for configured grant sidelink communications comprises determining a CBR for the CBR estimation pool, and determining a channel occupancy limit associated with the channel occupancy control parameter based at least in part on the CBR for the CBR estimation pool.

In a twenty-third aspect, alone or in combination with one or more of the first through twenty-second aspects, determining the channel occupancy limit associated with the channel occupancy control parameter based at least in part on the CBR for the CBR estimation pool comprises receiving a configuration indicating a mapping of CBRs to channel occupancy limits, and determining the channel occupancy limit associated with the channel occupancy control parameter based at least in part on the mapping of CBR to channel occupancy limit.

In a twenty-fourth aspect, alone or in combination with one or more of the first through twenty-third aspects, selecting the one or more resources from the resource pool based at least in part on the channel occupancy control parameter comprises determining a quantity of resources used by the UE for configured grant sidelink communications during a quantity of consecutive configured grant occasions, comparing the quantity of resources used by the UE for configured grant sidelink communications during the quantity of consecutive configured grant occasions to the channel occupancy limit that is determined based at least in part on the CBR for the CBR estimation pool, and selecting one or more resources from the resource pool if the quantity of resources used by the UE for configured grant sidelink communications during the quantity of consecutive configured grant occasions is less than the channel occupancy limit.

In a twenty-fifth aspect, alone or in combination with one or more of the first through twenty-fourth aspects, process 700 includes receiving a dynamic channel occupancy command indicating a channel occupancy limit.

In a twenty-sixth aspect, alone or in combination with one or more of the first through twenty-fifth aspects, selecting the one or more resources from the resource pool based at least in part on the channel occupancy control parameter comprises selecting the one or more resources from the resource pool based at least in part on the channel occupancy limit indicated by the dynamic channel occupancy command.

In a twenty-seventh aspect, alone or in combination with one or more of the first through twenty-sixth aspects, the configuration indicating the resource pool and the channel occupancy control parameter for configured grant sidelink communications comprises a first resource pool and a second resource pool for configured grant sidelink communications.

In a twenty-eighth aspect, alone or in combination with one or more of the first through twenty-seventh aspects, the first resource pool and the second resource pool are associated with the channel occupancy control parameter.

In a twenty-ninth aspect, alone or in combination with one or more of the first through twenty-eighth aspects, one or more resources included in the first resource pool overlap in a time domain with one or more resources included in the second resource pool.

In a thirtieth aspect, alone or in combination with one or more of the first through twenty-ninth aspects, the first resource pool is associated with the UE and the second resource pool is associated with the UE and one or more other UEs.

In a thirty-first aspect, alone or in combination with one or more of the first through thirtieth aspects, the configuration indicating the resource pool and the channel occupancy control parameter for configured grant sidelink communications comprises a first transmit power control setup associated with the first resource pool and a second transmit power control setup associated with the second resource pool.

In a thirty-second aspect, alone or in combination with one or more of the first through thirty-first aspects, the configuration indicating the resource pool and the channel occupancy control parameter for configured grant sidelink communications comprises an indication that the first resource pool is associated with a higher priority for configured grant sidelink communications than a priority associated with the second resource pool.

In a thirty-third aspect, alone or in combination with one or more of the first through thirty-second aspects, selecting the one or more resources from the resource pool based at least in part on the channel occupancy control parameter comprises determining that there are no resources available in the first resource pool for a configured grant sidelink communication in a configured grant occasion based at least in part on the channel occupancy control parameter, and selecting one or more resources from the second resource pool for the configured grant sidelink communication in the configured grant occasion based at least in part on determining that there are no resources available in the first resource pool.

In a thirty-fourth aspect, alone or in combination with one or more of the first through thirty-third aspects, the configuration indicating the resource pool and the channel occupancy control parameter for configured grant sidelink communications comprises a set of preference parameters associated with a set of resources included in the resource pool.

In a thirty-fifth aspect, alone or in combination with one or more of the first through thirty-fourth aspects, the set of preference parameters associated with the set of resources included in the resource pool indicate a preferred probability of occupancy, for a configured grant sidelink communication using the resource pool, in a time domain, a frequency domain, a spatial domain, or a combination thereof.

In a thirty-sixth aspect, alone or in combination with one or more of the first through thirty-fifth aspects, the set of preference parameters associated with the set of resources included in the resource pool include one or more preference parameters corresponding to one or more slot indexes, one or more preference parameters corresponding to one or more sub-channel indexes, or a combination thereof.

In a thirty-seventh aspect, alone or in combination with one or more of the first through thirty-sixth aspects, the configuration indicating the resource pool and the channel occupancy control parameter for configured grant sidelink communications comprises a channel occupancy weighting matrix associated with a set of resources included in the resource pool.

In a thirty-eighth aspect, alone or in combination with one or more of the first through thirty-seventh aspects, the channel occupancy weighting matrix associated with the set of resources included in the resource pool indicates one or more channel occupancy weights corresponding to one or more slot indexes, one or more channel occupancy weights corresponding to one or more sub-channel indexes, or a combination thereof.

In a thirty-ninth aspect, alone or in combination with one or more of the first through thirty-eighth aspects, selecting the one or more resources from the resource pool based at least in part on the channel occupancy control parameter comprises determining a channel occupancy value for one or more resources included in the resource pool based at least in part on the channel occupancy weighting matrix, and selecting the one or more resources included in the resource pool if the channel occupancy value for the one or more resources satisfies the channel occupancy control parameter.

In a fortieth aspect, alone or in combination with one or more of the first through thirty-ninth aspects, selecting the one or more resources from the resource pool based at least in part on the channel occupancy control parameter comprises determining a channel occupancy headroom value based at least in part on a sidelink transmit resource pool, and selecting the one or more resources from the resource pool if a channel occupancy value of the one or more resources is less than the channel occupancy headroom value.

In a forty-first aspect, alone or in combination with one or more of the first through fortieth aspects, determining the channel occupancy headroom value based at least in part on the sidelink transmit resource pool comprises determining a CBR for the sidelink transmit resource pool, determining a channel occupancy limit based at least in part on the CBR for the sidelink transmit resource pool, determining a channel occupancy value associated with the resource pool based at least in part on scheduled channel use, and determining the channel occupancy headroom value based at least in part on a difference between the channel occupancy limit and the channel occupancy value associated with the resource pool.

In a forty-second aspect, alone or in combination with one or more of the first through forty-first aspects, the resource pool is the sidelink transmit resource pool, wherein determining the channel occupancy headroom value based at least in part on the sidelink transmit resource pool comprises determining a channel busy ratio (CBR) for the sidelink transmit resource pool, determining a channel occupancy limit based at least in part on the CBR for the sidelink transmit resource pool, determining a channel occupancy value associated with the sidelink transmit resource pool based at least in part on scheduled channel use, and determining the channel occupancy headroom value based at least in part on a difference between the channel occupancy limit and the channel occupancy value associated with the sidelink transmit resource pool.

In a forty-third aspect, alone or in combination with one or more of the first through forty-second aspects, selecting the one or more resources from the resource pool based at least in part on the channel occupancy control parameter comprises selecting one or more resources from the sidelink transmit resource pool based at least in part on the channel occupancy headroom value.

In a forty-fourth aspect, alone or in combination with one or more of the first through forty-third aspects, the resource pool indicates a single resource, and the one or more resources are the single resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
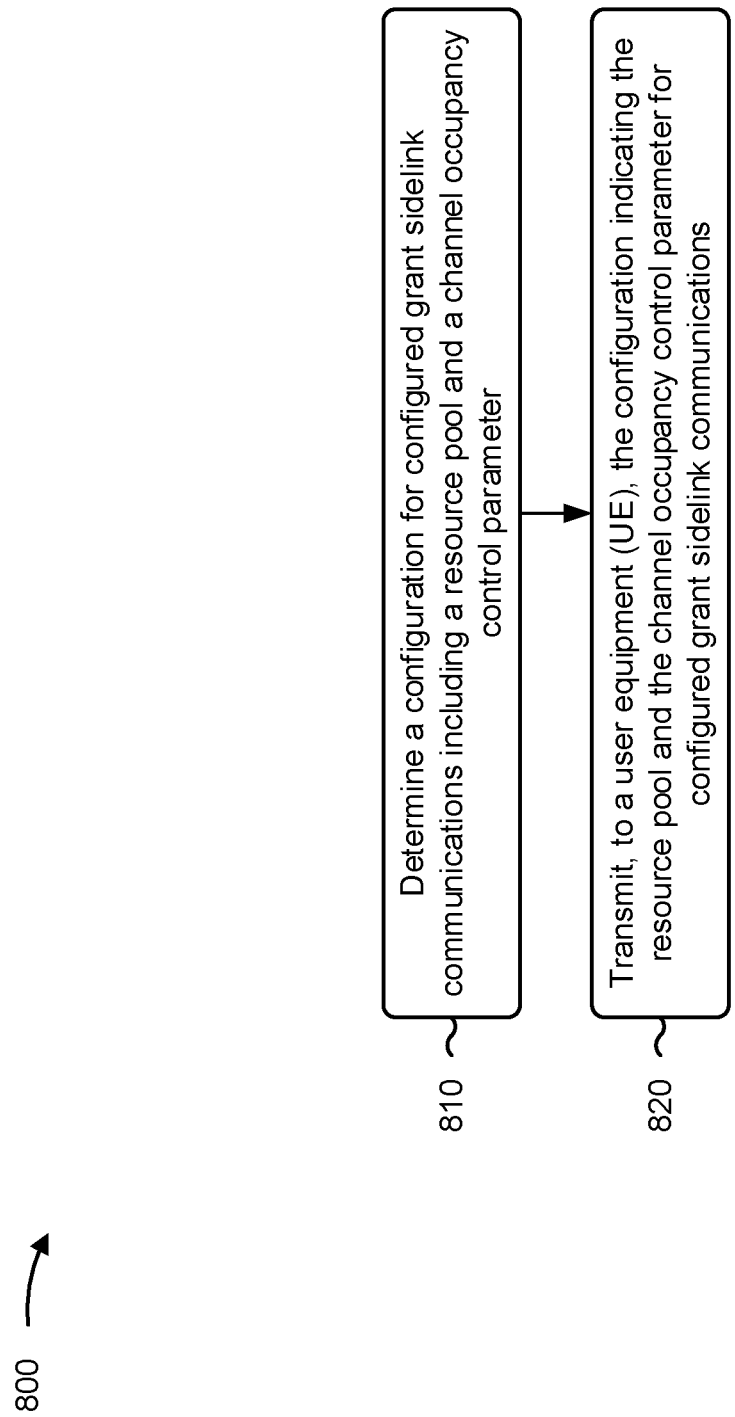

FIG. 8 is a diagram illustrating an example process 800 performed, in some aspects, by a wireless communication device, in accordance with the present disclosure. Example process 800 is an example where the wireless communication device (e.g., WCD 605, UE 120, base station 110, and/or the like) performs operations associated with configured grant sidelink communications.

As shown in FIG. 8, in some aspects, process 800 may include determining a configuration for configured grant sidelink communications including a resource pool and a channel occupancy control parameter (block 810). In some aspects, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; using antenna 252, demodulator 254, MIMO detector 256, receive processor 258, transmit processor 264, TX MIMO processor 266, modulator 254, controller/processor 280, and/or memory 282, and/or the like) may determine a configuration for configured grant sidelink communications including a resource pool and a channel occupancy control parameter, as described above.

As further shown in FIG. 8, in some aspects, process 800 may include transmitting, to a UE, the configuration indicating the resource pool and the channel occupancy control parameter for configured grant sidelink communications (block 820). In some aspects, the wireless communication device (e.g., using transmit processor 220, TX MIMO processor 230, modulator 232, antenna 234, controller/processor 240, memory 242, and/or scheduler 246; using antenna 252, transmit processor 264, TX MIMO processor 266, modulator 254, controller/processor 280, and/or memory 282, and/or the like) may transmit, to a UE, the configuration indicating the resource pool and the channel occupancy control parameter for configured grant sidelink communications, as described above.

Process 800 may include additional aspects, such as any single aspect or any combination of aspects described below and/or in connection with one or more other processes described elsewhere herein.

In a first aspect, process 800 includes receiving, from the UE, a configured grant sidelink communication in a configured grant occasion using one or more resources included in the resource pool.

In a second aspect, alone or in combination with the first aspect, determining the configuration for configured grant sidelink communications including the resource pool and the channel occupancy control parameter comprises determining a set of resources per configured grant occasion to be included in the resource pool.

In a third aspect, alone or in combination with one or more of the first and second aspects, determining the configuration for configured grant sidelink communications including the resource pool and the channel occupancy control parameter comprises determining a periodic schedule for configured grant occasions for configured grant sidelink communications.

In a fourth aspect, alone or in combination with one or more of the first through third aspects, determining the configuration for configured grant sidelink communications including the resource pool and the channel occupancy control parameter comprises determining a plurality of slots in a time domain and a plurality of sub-channels in a frequency domain to be included in the resource pool.

In a fifth aspect, alone or in combination with one or more of the first through fourth aspects, determining the configuration for configured grant sidelink communications including the resource pool and the channel occupancy control parameter comprises determining a transmit power control setup for configured grant sidelink communications.

In a sixth aspect, alone or in combination with one or more of the first through fifth aspects, determining the configuration for configured grant sidelink communications including the resource pool and the channel occupancy control parameter comprises determining a channel occupancy ratio control parameter for configured grant sidelink communications.

In a seventh aspect, alone or in combination with one or more of the first through sixth aspects, transmitting the configuration indicating the resource pool and the channel occupancy control parameter for configured grant sidelink communications comprises transmitting the configuration using Layer 3 signaling.

In an eighth aspect, alone or in combination with one or more of the first through seventh aspects, the wireless communication device is a base station, and transmitting the configuration using Layer 3 signaling comprises transmitting a radio resource control signal indicating the configuration.

In a ninth aspect, alone or in combination with one or more of the first through eighth aspects, the wireless communication device is a UE, and transmitting the configuration using Layer 3 signaling comprises transmitting a sidelink radio resource control signal indicating the configuration.

In a tenth aspect, alone or in combination with one or more of the first through ninth aspects, transmitting the configuration indicating the resource pool and the channel occupancy control parameter for configured grant sidelink communications comprises transmitting a Layer 3 signal indicating a time domain resource allocation for the resource pool, and transmitting a dynamic Layer 1 signal indicating a frequency domain resource allocation for the resource pool.

In an eleventh aspect, alone or in combination with one or more of the first through tenth aspects, the wireless communication device is a base station, and transmitting the dynamic Layer 1 signal indicating the frequency domain resource allocation for the resource pool comprises transmitting a downlink control information communication indicating the frequency domain resource allocation for the resource pool.

In a twelfth aspect, alone or in combination with one or more of the first through eleventh aspects, the wireless communication device is a UE, and transmitting the dynamic Layer 1 signal indicating the frequency domain resource allocation for the resource pool comprises transmitting a sidelink control information communication indicating the frequency domain resource allocation for the resource pool.

In a thirteenth aspect, alone or in combination with one or more of the first through twelfth aspects, transmitting the dynamic Layer 1 signal indicating the frequency domain resource allocation for the resource pool comprises transmitting the dynamic Layer 1 signal indicating a transmit power control setup for configured grant sidelink communications.

In a fourteenth aspect, alone or in combination with one or more of the first through thirteenth aspects, the transmit power control setup indicates an open loop power control configuration to be used for configured grant sidelink communications with the wireless communication device or one or more other UEs.

In a fifteenth aspect, alone or in combination with one or more of the first through fourteenth aspects, the transmit power control setup indicates a fractional power control configuration that is based at least in part on a fractional power control configuration associated with a different radio access technology than a radio access technology associated with the configured grant sidelink communications.

In a sixteenth aspect, alone or in combination with one or more of the first through fifteenth aspects, determining the configuration for configured grant sidelink communications including the resource pool and the channel occupancy control parameter comprises determining a channel occupancy limit for configured grant sidelink communications using resources included in the resource pool over a quantity of consecutive configured grant occasions.

In a seventeenth aspect, alone or in combination with one or more of the first through sixteenth aspects, determining the configuration for configured grant sidelink communications including the resource pool and the channel occupancy control parameter comprises determining a CBR estimation pool associated with the channel occupancy control parameter.

In an eighteenth aspect, alone or in combination with one or more of the first through seventeenth aspects, determining the CBR estimation pool associated with the channel occupancy control parameter comprises determining one or more resource pools associated with one or more configurations for configured grant sidelink communications of one or more UEs.

In a nineteenth aspect, alone or in combination with one or more of the first through eighteenth aspects, the one or more resource pools overlap in a time domain, a frequency domain, a spatial domain, or a combination thereof.

In a twentieth aspect, alone or in combination with one or more of the first through nineteenth aspects, determining the estimation pool associated with the channel occupancy control parameter comprises determining a mapping of CBRs to channel occupancy limits, and transmitting a configuration indicating the mapping of CBR to channel occupancy limit.

In a twenty-first aspect, alone or in combination with one or more of the first through twentieth aspects, process 800 includes transmitting a dynamic channel occupancy command indicating a channel occupancy limit.

In a twenty-second aspect, alone or in combination with one or more of the first through twenty-first aspects, determining the configuration for configured grant sidelink communications including the resource pool and the channel occupancy control parameter comprises determining a first resource pool and a second resource pool for configured grant sidelink communications.

In a twenty-third aspect, alone or in combination with one or more of the first through twenty-second aspects, determining the configuration for configured grant sidelink communications including the resource pool and the channel occupancy control parameter comprises determining that the first resource pool and the second resource pool are associated with the channel occupancy control parameter.

In a twenty-fourth aspect, alone or in combination with one or more of the first through twenty-third aspects, one or more resources included in the first resource pool overlap in a time domain with one or more resources included in the second resource pool.

In a twenty-fifth aspect, alone or in combination with one or more of the first through twenty-fourth aspects, determining the configuration for configured grant sidelink communications including the resource pool and the channel occupancy control parameter comprises determining that the first resource pool is associated with the UE and the second resource pool is associated with the UE and one or more other UEs.

In a twenty-sixth aspect, alone or in combination with one or more of the first through twenty-fifth aspects, determining the configuration for configured grant sidelink communications including the resource pool and the channel occupancy control parameter comprises determining a first transmit power control setup associated with the first resource pool, and determining a second transmit power control setup associated with the second resource pool.

In a twenty-seventh aspect, alone or in combination with one or more of the first through twenty-sixth aspects, determining the configuration for configured grant sidelink communications including the resource pool and the channel occupancy control parameter comprises determining that the first resource pool is associated with a higher priority for configured grant sidelink communications than a priority associated with the second resource pool.

In a twenty-eighth aspect, alone or in combination with one or more of the first through twenty-seventh aspects, determining the configuration for configured grant sidelink communications including the resource pool and the channel occupancy control parameter comprises determining a set of preference parameters associated with a set of resources included in the resource pool.

In a twenty-ninth aspect, alone or in combination with one or more of the first through twenty-eighth aspects, determining the set of preference parameters associated with the set of resources included in the resource pool comprises determining a preferred probability of occupancy, for a configured grant sidelink communication using the resource pool, in a time domain, a frequency domain, a spatial domain, or a combination thereof.

In a thirtieth aspect, alone or in combination with one or more of the first through twenty-ninth aspects, determining the set of preference parameters associated with the set of resources included in the resource pool comprises determining one or more preference parameters corresponding to one or more slot indexes, determining one or more preference parameters corresponding to one or more sub-channel indexes, or a combination thereof.

In a thirty-first aspect, alone or in combination with one or more of the first through thirtieth aspects, determining the configuration for configured grant sidelink communications including the resource pool and the channel occupancy control parameter comprises determining a channel occupancy weighting matrix associated with a set of resources included in the resource pool.

In a thirty-second aspect, alone or in combination with one or more of the first through thirty-first aspects, determining the channel occupancy weighting matrix associated with the set of resources included in the resource pool comprises determining one or more channel occupancy weights corresponding to one or more slot indexes, determining one or more channel occupancy weights corresponding to one or more sub-channel indexes, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving a configuration indicating a resource pool and a channel occupancy control parameter for configured grant sidelink communications; selecting one or more resources from the resource pool based at least in part on the channel occupancy control parameter; and transmitting a configured grant sidelink communication using the one or more resources from the resource pool.

Aspect 2: The method of Aspect 1, wherein the resource pool indicates a set of resources per configured grant occasion.

Aspect 3: The method of any of Aspects 1-2, wherein receiving the configuration indicating the resource pool and the channel occupancy control parameter for configured grant sidelink communications comprises: receiving a configuration indicating a periodic schedule for configured grant occasions for configured grant sidelink communications.

Aspect 4: The method of any of Aspects 1-3, wherein the resource pool indicates a plurality of slots in a time domain and a plurality of sub-channels in a frequency domain.

Aspect 5: The method of any of Aspects 1-4, wherein receiving the configuration indicating the resource pool and the channel occupancy control parameter for configured grant sidelink communications comprises: receiving the configuration indicating a transmit power control setup for configured grant sidelink communications.

Aspect 6: The method of any of Aspects 1-5, wherein transmitting the configured grant sidelink communication using the one or more resources from the resource pool comprises: transmitting a plurality of transport blocks associated with the configured grant sidelink communication in a single configured grant occasion.

Aspect 7: The method of any of Aspects 1-6, wherein selecting the one or more resources from the resource pool based at least in part on the channel occupancy control parameter comprises: determining a quantity of sub-channels used by the UE in a quantity of consecutive configured grant occasions; comparing the quantity of sub-channels used by the UE in the quantity of consecutive configured grant occasions to the channel occupancy control parameter, wherein the channel occupancy control parameter indicates a maximum quantity of sub-channels that can be used by the UE in the quantity of consecutive configured grant occasions; and selecting one or more resources from the resource pool based at least in part on comparing the quantity of sub-channels used by the UE in the quantity of consecutive configured grant occasions to the channel occupancy control parameter.

Aspect 8: The method of any of Aspects 1-7, wherein the channel occupancy control parameter is a channel occupancy ratio control parameter.

Aspect 9: The method of any of Aspects 1-8, wherein receiving the configuration indicating the resource pool and the channel occupancy control parameter for configured grant sidelink communications comprises: receiving the configuration using Layer 3 signaling.

Aspect 10: The method of Aspect 9, wherein receiving the configuration using Layer 3 signaling comprises: receiving, from a base station, a radio resource control signal indicating the configuration.

Aspect 11: The method of Aspect 9, wherein receiving the configuration using Layer 3 signaling comprises: receiving, from another UE, a sidelink radio resource control signal indicating the configuration.

Aspect 12: The method of any of Aspects 1-11, wherein receiving the configuration indicating the resource pool and the channel occupancy control parameter for configured grant sidelink communications comprises: receiving a Layer 3 signal indicating a time domain resource allocation for the resource pool; and receiving a dynamic Layer 1 signal indicating a frequency domain resource allocation for the resource pool.

Aspect 13: The method of Aspect 12, wherein receiving the dynamic Layer 1 signal indicating the frequency domain resource allocation for the resource pool comprises: receiving, from a base station, a downlink control information communication indicating the frequency domain resource allocation for the resource pool.

Aspect 14: The method of Aspect 12, wherein receiving the dynamic Layer 1 signal indicating the frequency domain resource allocation for the resource pool comprises: receiving, from another UE, a sidelink control information communication indicating the frequency domain resource allocation for the resource pool.

Aspect 15: The method of any of Aspects 12-14, wherein receiving the dynamic Layer 1 signal indicating the frequency domain resource allocation for the resource pool comprises: receiving, from a wireless communication device, the dynamic Layer 1 signal indicating a transmit power control setup for configured grant sidelink communications.

Aspect 16: The method of Aspect 15, wherein the transmit power control setup indicates an open loop power control configuration to be used for configured grant sidelink communications with the wireless communication device or one or more other UEs.

Aspect 17: The method of Aspect 15, wherein the transmit power control setup indicates a fractional power control configuration that is based at least in part on a fractional power control configuration associated with a different radio access technology than a radio access technology associated with the configured grant sidelink communications.

Aspect 18: The method of any of Aspects 1-17, wherein the channel occupancy control parameter indicates a channel occupancy limit for configured grant sidelink communications using resources included in the resource pool over a quantity of consecutive configured grant occasions.

Aspect 19: The method of Aspect 18, wherein selecting the one or more resources from the resource pool based at least in part on the channel occupancy control parameter comprises: determining a quantity of resources used by the UE for configured grant sidelink communications during the quantity of consecutive configured grant occasions; comparing the quantity of resources used by the UE for configured grant sidelink communications during the quantity of consecutive configured grant occasions to the channel occupancy limit; and selecting one or more resources from the resource pool if the quantity of resources used by the UE for configured grant sidelink communications during the quantity of consecutive configured grant occasions is less than the channel occupancy limit.

Aspect 20: The method of any of Aspects 1-19, wherein receiving the configuration indicating the resource pool and the channel occupancy control parameter for configured grant sidelink communications comprises: receiving the configuration indicating a channel busy ratio (CBR) estimation pool.

Aspect 21: The method of Aspect 20, wherein the CBR estimation pool comprises the resource pool and one or more other resource pools associated with one or more other configurations for configured grant sidelink communications of other UEs.

Aspect 22: The method of Aspect 21, wherein the one or more other resource pools overlap with the resource pool in: a time domain, a frequency domain, a spatial domain, or a combination thereof.

Aspect 23: The method of any of Aspects 20-22, wherein receiving the configuration indicating the resource pool and the channel occupancy control parameter for configured grant sidelink communications comprises: determining a CBR for the CBR estimation pool; and determining a channel occupancy limit associated with the channel occupancy control parameter based at least in part on the CBR for the CBR estimation pool.

Aspect 24: The method of Aspect 23, wherein determining the channel occupancy limit associated with the channel occupancy control parameter based at least in part on the CBR for the CBR estimation pool comprises: receiving a configuration indicating a mapping of CBRs to channel occupancy limits; and determining the channel occupancy limit associated with the channel occupancy control parameter based at least in part on the mapping of CBR to channel occupancy limit.

Aspect 25: The method of any of Aspects 23-24, wherein selecting the one or more resources from the resource pool based at least in part on the channel occupancy control parameter comprises: determining a quantity of resources used by the UE for configured grant sidelink communications during a quantity of consecutive configured grant occasions; comparing the quantity of resources used by the UE for configured grant sidelink communications during the quantity of consecutive configured grant occasions to the channel occupancy limit that is determined based at least in part on the CBR for the CBR estimation pool; and selecting one or more resources from the resource pool if the quantity of resources used by the UE for configured grant sidelink communications during the quantity of consecutive configured grant occasions is less than the channel occupancy limit.

Aspect 26: The method of any of Aspects 1-25, further comprising: receiving a dynamic channel occupancy command indicating a channel occupancy limit.

Aspect 27: The method of Aspect 26, wherein selecting the one or more resources from the resource pool based at least in part on the channel occupancy control parameter comprises: selecting the one or more resources from the resource pool based at least in part on the channel occupancy limit indicated by the dynamic channel occupancy command.

Aspect 28: The method of any of Aspects 1-27, wherein the configuration indicating the resource pool and the channel occupancy control parameter for configured grant sidelink communications comprises: a first resource pool and a second resource pool for configured grant sidelink communications.

Aspect 29: The method of Aspect 28, wherein the first resource pool and the second resource pool are associated with the channel occupancy control parameter.

Aspect 30: The method of any of Aspects 28-29, wherein one or more resources included in the first resource pool overlap in a time domain with one or more resources included in the second resource pool.

Aspect 31: The method of any of Aspects 28-30, wherein the first resource pool is associated with the UE and the second resource pool is associated with the UE and one or more other UEs.

Aspect 32: The method of any of Aspects 28-31, wherein the configuration indicating the resource pool and the channel occupancy control parameter for configured grant sidelink communications comprises: a first transmit power control setup associated with the first resource pool and a second transmit power control setup associated with the second resource pool.

Aspect 33: The method of any of Aspects 28-32, wherein the configuration indicating the resource pool and the channel occupancy control parameter for configured grant sidelink communications comprises: an indication that the first resource pool is associated with a higher priority for configured grant sidelink communications than a priority associated with the second resource pool.

Aspect 34: The method of any of Aspects 28-33, wherein selecting the one or more resources from the resource pool based at least in part on the channel occupancy control parameter comprises: determining that there are no resources available in the first resource pool for a configured grant sidelink communication in a configured grant occasion based at least in part on the channel occupancy control parameter; and selecting one or more resources from the second resource pool for the configured grant sidelink communication in the configured grant occasion based at least in part on determining that there are no resources available in the first resource pool.

Aspect 35: The method of any of Aspects 1-34, wherein the configuration indicating the resource pool and the channel occupancy control parameter for configured grant sidelink communications comprises: a set of preference parameters associated with a set of resources included in the resource pool.

Aspect 36: The method of Aspect 35, wherein the set of preference parameters associated with the set of resources included in the resource pool indicate a preferred probability of occupancy, for a configured grant sidelink communication using the resource pool, in: a time domain, a frequency domain, a spatial domain, or a combination thereof.

Aspect 37: The method of any of Aspects 35-36, wherein the set of preference parameters associated with the set of resources included in the resource pool include: one or more preference parameters corresponding to one or more slot indexes, one or more preference parameters corresponding to one or more sub-channel indexes, or a combination thereof.

Aspect 38: The method of any of Aspects 1-37, wherein the configuration indicating the resource pool and the channel occupancy control parameter for configured grant sidelink communications comprises: a channel occupancy weighting matrix associated with a set of resources included in the resource pool.

Aspect 39: The method of Aspect 38, wherein the channel occupancy weighting matrix associated with the set of resources included in the resource pool indicates: one or more channel occupancy weights corresponding to one or more slot indexes, one or more channel occupancy weights corresponding to one or more sub-channel indexes, or a combination thereof.

Aspect 40: The method of any of Aspects 38-39, wherein selecting the one or more resources from the resource pool based at least in part on the channel occupancy control parameter comprises: determining a channel occupancy value for one or more resources included in the resource pool based at least in part on the channel occupancy weighting matrix; and selecting the one or more resources included in the resource pool if the channel occupancy value for the one or more resources satisfies the channel occupancy control parameter.

Aspect 41: The method of any of Aspects 1-40, wherein selecting the one or more resources from the resource pool based at least in part on the channel occupancy control parameter comprises: determining a channel occupancy headroom value based at least in part on a sidelink transmit resource pool; and selecting the one or more resources from the resource pool if a channel occupancy value of the one or more resources is less than the channel occupancy headroom value.

Aspect 42: The method of Aspect 41, wherein determining the channel occupancy headroom value based at least in part on the sidelink transmit resource pool comprises: determining a channel busy ratio (CBR) for the sidelink transmit resource pool; determining a channel occupancy limit based at least in part on the CBR for the sidelink transmit resource pool; determining a channel occupancy value associated with the resource pool based at least in part on scheduled channel use; and determining the channel occupancy headroom value based at least in part on a difference between the channel occupancy limit and the channel occupancy value associated with the resource pool.

Aspect 43: The method of any of Aspects 41-42, wherein the resource pool is the sidelink transmit resource pool, and wherein determining the channel occupancy headroom value based at least in part on the sidelink transmit resource pool comprises: determining a channel busy ratio (CBR) for the sidelink transmit resource pool; determining a channel occupancy limit based at least in part on the CBR for the sidelink transmit resource pool; determining a channel occupancy value associated with the sidelink transmit resource pool based at least in part on scheduled channel use; and determining the channel occupancy headroom value based at least in part on a difference between the channel occupancy limit and the channel occupancy value associated with the sidelink transmit resource pool.

Aspect 44: The method of Aspect 43, wherein selecting the one or more resources from the resource pool based at least in part on the channel occupancy control parameter comprises: selecting one or more resources from the sidelink transmit resource pool based at least in part on the channel occupancy headroom value.

Aspect 45: The method of any of Aspects 1-44, wherein the resource pool indicates a single resource, and wherein the one or more resources are the single resource.

Aspect 46: A method of wireless communication performed by a wireless communication device, comprising: determining a configuration for configured grant sidelink communications including a resource pool and a channel occupancy control parameter; and transmitting, to a user equipment (UE), the configuration indicating the resource pool and the channel occupancy control parameter for configured grant sidelink communications.

Aspect 47: The method of Aspect 46, further comprising: receiving, from the UE, a configured grant sidelink communication in a configured grant occasion using one or more resources included in the resource pool.

Aspect 48: The method of any of Aspects 46-47, wherein determining the configuration for configured grant sidelink communications including the resource pool and the channel occupancy control parameter comprises: determining a set of resources per configured grant occasion to be included in the resource pool.

Aspect 49: The method of any of Aspects 46-48, wherein determining the configuration for configured grant sidelink communications including the resource pool and the channel occupancy control parameter comprises: determining a periodic schedule for configured grant occasions for configured grant sidelink communications.

Aspect 50: The method of any of Aspects 46-49, wherein determining the configuration for configured grant sidelink communications including the resource pool and the channel occupancy control parameter comprises: determining a plurality of slots in a time domain and a plurality of sub-channels in a frequency domain to be included in the resource pool.

Aspect 51: The method of any of Aspects 46-50, wherein determining the configuration for configured grant sidelink communications including the resource pool and the channel occupancy control parameter comprises: determining a transmit power control setup for configured grant sidelink communications.

Aspect 52: The method of any of Aspects 46-51, wherein determining the configuration for configured grant sidelink communications including the resource pool and the channel occupancy control parameter comprises: determining a channel occupancy ratio control parameter for configured grant sidelink communications.

Aspect 53: The method of any of Aspects 46-52, wherein transmitting the configuration indicating the resource pool and the channel occupancy control parameter for configured grant sidelink communications comprises: transmitting the configuration using Layer 3 signaling.

Aspect 54: The method of Aspect 53, wherein the wireless communication device is a base station, and wherein transmitting the configuration using Layer 3 signaling comprises: transmitting a radio resource control signal indicating the configuration.

Aspect 55: The method of Aspect 53, wherein the wireless communication device is a UE, and wherein transmitting the configuration using Layer 3 signaling comprises: transmitting a sidelink radio resource control signal indicating the configuration.

Aspect 56: The method of any of Aspects 46-55, wherein transmitting the configuration indicating the resource pool and the channel occupancy control parameter for configured grant sidelink communications comprises: transmitting a Layer 3 signal indicating a time domain resource allocation for the resource pool; and transmitting a dynamic Layer 1 signal indicating a frequency domain resource allocation for the resource pool.

Aspect 57: The method of Aspect 56, wherein the wireless communication device is a base station, and wherein transmitting the dynamic Layer 1 signal indicating the frequency domain resource allocation for the resource pool comprises: transmitting a downlink control information communication indicating the frequency domain resource allocation for the resource pool.

Aspect 58: The method of Aspect 56, wherein the wireless communication device is a UE, and wherein transmitting the dynamic Layer 1 signal indicating the frequency domain resource allocation for the resource pool comprises: transmitting a sidelink control information communication indicating the frequency domain resource allocation for the resource pool.

Aspect 59: The method of any of Aspects 56-58, wherein transmitting the dynamic Layer 1 signal indicating the frequency domain resource allocation for the resource pool comprises: transmitting the dynamic Layer 1 signal indicating a transmit power control setup for configured grant sidelink communications.

Aspect 60: The method of Aspect 59, wherein the transmit power control setup indicates an open loop power control configuration to be used for configured grant sidelink communications with the wireless communication device or one or more other UEs.

Aspect 61: The method of Aspect 59, wherein the transmit power control setup indicates a fractional power control configuration that is based at least in part on a fractional power control configuration associated with a different radio access technology than a radio access technology associated with the configured grant sidelink communications.

Aspect 62: The method of any of Aspects 46-61, wherein determining the configuration for configured grant sidelink communications including the resource pool and the channel occupancy control parameter comprises: determining a channel occupancy limit for configured grant sidelink communications using resources included in the resource pool over a quantity of consecutive configured grant occasions.

Aspect 63: The method of any of Aspects 46-62, wherein determining the configuration for configured grant sidelink communications including the resource pool and the channel occupancy control parameter comprises: determining a channel busy ratio (CBR) estimation pool associated with the channel occupancy control parameter.

Aspect 64: The method of Aspect 63, wherein determining the CBR estimation pool associated with the channel occupancy control parameter comprises: determining one or more resource pools associated with one or more configurations for configured grant sidelink communications of one or more UEs.

Aspect 65: The method of Aspect 64, wherein the one or more resource pools overlap in: a time domain, a frequency domain, a spatial domain, or a combination thereof.

Aspect 66: The method of any of Aspects 63-65, wherein determining the estimation pool associated with the channel occupancy control parameter comprises: determining a mapping of CBRs to channel occupancy limits; and transmitting a configuration indicating the mapping of CBR to channel occupancy limit.

Aspect 67: The method of any of Aspects 46-66, further comprising: transmitting a dynamic channel occupancy command indicating a channel occupancy limit.

Aspect 68: The method of any of Aspects 46-67, wherein determining the configuration for configured grant sidelink communications including the resource pool and the channel occupancy control parameter comprises: determining a first resource pool and a second resource pool for configured grant sidelink communications.

Aspect 69: The method of Aspect 68, wherein determining the configuration for configured grant sidelink communications including the resource pool and the channel occupancy control parameter comprises: determining that the first resource pool and the second resource pool are associated with the channel occupancy control parameter.

Aspect 70: The method of any of Aspects 68-69, wherein one or more resources included in the first resource pool overlap in a time domain with one or more resources included in the second resource pool.

Aspect 71: The method of any of Aspects 68-69, wherein determining the configuration for configured grant sidelink communications including the resource pool and the channel occupancy control parameter comprises: determining that the first resource pool is associated with the UE and the second resource pool is associated with the UE and one or more other UEs.

Aspect 72: The method of any of Aspects 68-71, wherein determining the configuration for configured grant sidelink communications including the resource pool and the channel occupancy control parameter comprises: determining a first transmit power control setup associated with the first resource pool; and determining a second transmit power control setup associated with the second resource pool.

Aspect 73: The method of any of Aspects 68-72, wherein determining the configuration for configured grant sidelink communications including the resource pool and the channel occupancy control parameter comprises: determining that the first resource pool is associated with a higher priority for configured grant sidelink communications than a priority associated with the second resource pool.

Aspect 74: The method of any of Aspects 46-73, wherein determining the configuration for configured grant sidelink communications including the resource pool and the channel occupancy control parameter comprises: determining a set of preference parameters associated with a set of resources included in the resource pool.

Aspect 75: The method of Aspect 74, wherein determining the set of preference parameters associated with the set of resources included in the resource pool comprises: determining a preferred probability of occupancy, for a configured grant sidelink communication using the resource pool, in: a time domain, a frequency domain, a spatial domain, or a combination thereof.

Aspect 76: The method of any of Aspects 74-75, wherein determining the set of preference parameters associated with the set of resources included in the resource pool comprises: determining one or more preference parameters corresponding to one or more slot indexes, determining one or more preference parameters corresponding to one or more sub-channel indexes, or a combination thereof.

Aspect 77: The method of any of Aspects 46-76, wherein determining the configuration for configured grant sidelink communications including the resource pool and the channel occupancy control parameter comprises: determining a channel occupancy weighting matrix associated with a set of resources included in the resource pool.

Aspect 78: The method of Aspect 77, wherein determining the channel occupancy weighting matrix associated with the set of resources included in the resource pool comprises: determining one or more channel occupancy weights corresponding to one or more slot indexes, determining one or more channel occupancy weights corresponding to one or more sub-channel indexes, or a combination thereof.

Aspect 79: An apparatus for wireless communication at a device, comprising a processor; memory coupled with the processor; and instructions stored in the memory and executable by the processor to cause the apparatus to perform the method of one or more of Aspects 1-45.

Aspect 80: A device for wireless communication, comprising a memory and one or more processors coupled to the memory, the one or more processors configured to perform the method of one or more of Aspects 1-45.

Aspect 81: An apparatus for wireless communication, comprising at least one means for performing the method of one or more of Aspects 1-45.

Aspect 82: A non-transitory computer-readable medium storing code for wireless communication, the code comprising instructions executable by a processor to perform the method of one or more of Aspects 1-45.

Aspect 83: A non-transitory computer-readable medium storing a set of instructions for wireless communication, the set of instructions comprising one or more instructions that, when executed by one or more processors of a device, cause the device to perform the method of one or more of Aspects 1-45.

Aspect 84: An apparatus for wireless communication at a device, comprising a processor; memory coupled with the processor; and instructions stored in the memory and executable by the processor to cause the apparatus to perform the method of one or more of Aspects 46-78.

Aspect 85: A device for wireless communication, comprising a memory and one or more processors coupled to the memory, the one or more processors configured to perform the method of one or more of Aspects 46-78.

Aspect 86: An apparatus for wireless communication, comprising at least one means for performing the method of one or more of Aspects 46-78.

Aspect 87: A non-transitory computer-readable medium storing code for wireless communication, the code comprising instructions executable by a processor to perform the method of one or more of Aspects 46-78.

Aspect 88: A non-transitory computer-readable medium storing a set of instructions for wireless communication, the set of instructions comprising one or more instructions that, when executed by one or more processors of a device, cause the device to perform the method of one or more of Aspects 46-78.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a configuration indicating a resource pool and a channel occupancy control parameter for configured grant sidelink communications;
   selecting one or more resources from the resource pool based at least in part on the channel occupancy control parameter; and
   transmitting a configured grant sidelink communication using the one or more resources from the resource pool, wherein the configuration indicating the resource pool and the channel occupancy control parameter for configured grant sidelink communications comprises a channel occupancy weighting matrix associated with a set of resources included in the resource pool.

2. The method of claim 1, wherein receiving the configuration indicating the resource pool and the channel occupancy control parameter for configured grant sidelink communications comprises:
receiving the configuration indicating a transmit power control setup for configured grant sidelink communications.

3. The method of claim 1, wherein selecting the one or more resources from the resource pool based at least in part on the channel occupancy control parameter comprises:
determining a quantity of sub-channels used by the UE in a quantity of consecutive configured grant occasions;
comparing the quantity of sub-channels used by the UE in the quantity of consecutive configured grant occasions to the channel occupancy control parameter, wherein the channel occupancy control parameter indicates a maximum quantity of sub-channels that can be used by the UE in the quantity of consecutive configured grant occasions; and
selecting the one or more resources from the resource pool based at least in part on comparing the quantity of sub-channels used by the UE in the quantity of consecutive configured grant occasions to the channel occupancy control parameter.

4. The method of claim 1, wherein the channel occupancy control parameter indicates a channel occupancy limit for configured grant sidelink communications using the one or more resources included in the resource pool over a quantity of consecutive configured grant occasions.

5. The method of claim 1, wherein receiving the configuration indicating the resource pool and the channel occupancy control parameter for configured grant sidelink communications comprises:
receiving the configuration indicating a channel busy ratio (CBR) estimation pool.

6. The method of claim 1, further comprising:
receiving a dynamic channel occupancy command indicating a channel occupancy limit.

7. The method of claim 1, wherein the configuration indicating the resource pool and the channel occupancy control parameter for configured grant sidelink communications comprises a first resource pool and a second resource pool for configured grant sidelink communications.

8. The method of claim 7, wherein the first resource pool and the second resource pool are associated with the channel occupancy control parameter.

9. The method of claim 7, wherein the configuration indicating the resource pool and the channel occupancy control parameter for configured grant sidelink communications comprises an indication that the first resource pool is associated with a higher priority for configured grant sidelink communications than a priority associated with the second resource pool.

10. The method of claim 1, wherein the configuration indicating the resource pool and the channel occupancy control parameter for configured grant sidelink communications comprises a set of preference parameters associated with the set of resources included in the resource pool.

11. The method of claim 1, wherein selecting the one or more resources from the resource pool based at least in part on the channel occupancy control parameter comprises:
determining a channel occupancy headroom value based at least in part on a sidelink transmit resource pool; and
selecting the one or more resources from the resource pool if a channel occupancy value of the one or more resources is less than the channel occupancy headroom value.

12. The method of claim 11, wherein the resource pool is the sidelink transmit resource pool, and wherein determining the channel occupancy headroom value based at least in part on the sidelink transmit resource pool comprises:
determining a channel busy ratio (CBR) for the sidelink transmit resource pool;
determining a channel occupancy limit based at least in part on the CBR for the sidelink transmit resource pool;
determining the channel occupancy value associated with the sidelink transmit resource pool based at least in part on scheduled channel use; and
determining the channel occupancy headroom value based at least in part on a difference between the channel occupancy limit and the channel occupancy value associated with the sidelink transmit resource pool.

13. The method of claim 1, wherein the resource pool indicates a single resource, and wherein the one or more resources are the single resource.

14. A user equipment (UE) for wireless communication, comprising:
a memory; and
one or more processors, coupled to the memory, configured to:
receive a configuration indicating a resource pool and a channel occupancy control parameter for configured grant sidelink communications;
select one or more resources from the resource pool based at least in part on the channel occupancy control parameter; and
transmit a configured grant sidelink communication using the one or more resources from the resource pool,
wherein the configuration indicating the resource pool and the channel occupancy control parameter for configured grant sidelink communications comprises a channel occupancy weighting matrix associated with a set of resources included in the resource pool.

15. The UE of claim 14, wherein the one or more processors, to receive the configuration indicating the resource pool and the channel occupancy control parameter for configured grant sidelink communications, are configured to:
receive the configuration indicating a transmit power control setup for configured grant sidelink communications.

16. The UE of claim 14, wherein the one or more processors, to select the one or more resources from the resource pool based at least in part on the channel occupancy control parameter, are configured to:
determine a quantity of sub-channels used by the UE in a quantity of consecutive configured grant occasions;
compare the quantity of sub-channels used by the UE in the quantity of consecutive configured grant occasions to the channel occupancy control parameter, wherein the channel occupancy control parameter indicates a maximum quantity of sub-channels that can be used by the UE in the quantity of consecutive configured grant occasions; and
select the one or more resources from the resource pool based at least in part on comparing the quantity of sub-channels used by the UE in the quantity of consecutive configured grant occasions to the channel occupancy control parameter.

17. The UE of claim 14, wherein the channel occupancy control parameter indicates a channel occupancy limit for configured grant sidelink communications using the one or more resources included in the resource pool over a quantity of consecutive configured grant occasions.

18. The UE of claim 14, wherein the one or more processors, to receive the configuration indicating the resource pool and the channel occupancy control parameter for configured grant sidelink communications, are configured to:
receive the configuration indicating a channel busy ratio (CBR) estimation pool.

19. The UE of claim 14, wherein the one or more processors are further configured to:
receive a dynamic channel occupancy command indicating a channel occupancy limit.

20. The UE of claim 14, wherein the configuration indicating the resource pool and the channel occupancy control parameter for configured grant sidelink communications comprises a first resource pool and a second resource pool for configured grant sidelink communications.

21. The UE of claim 20, wherein the first resource pool and the second resource pool are associated with the channel occupancy control parameter.

22. The UE of claim 20, wherein the configuration indicating the resource pool and the channel occupancy control parameter for configured grant sidelink communications comprises an indication that the first resource pool is associated with a higher priority for configured grant sidelink communications than a priority associated with the second resource pool.

23. The UE of claim 14, wherein the configuration indicating the resource pool and the channel occupancy control parameter for configured grant sidelink communications comprises a set of preference parameters associated with the set of resources included in the resource pool.

24. The UE of claim 14, wherein the one or more processors, to select the one or more resources from the resource pool based at least in part on the channel occupancy control parameter, are configured to:
determine a channel occupancy headroom value based at least in part on a sidelink transmit resource pool; and
select the one or more resources from the resource pool if a channel occupancy value of the one or more resources is less than the channel occupancy headroom value.

25. The UE of claim 24, wherein the resource pool is the sidelink transmit resource pool, and wherein the one or more processors, to determine the channel occupancy headroom value based at least in part on the sidelink transmit resource pool, are configured to:
determine a channel busy ratio (CBR) for the sidelink transmit resource pool;
determine a channel occupancy limit based at least in part on the CBR for the sidelink transmit resource pool;
determine the channel occupancy value associated with the sidelink transmit resource pool based at least in part on scheduled channel use; and
determine the channel occupancy headroom value based at least in part on a difference between the channel occupancy limit and the channel occupancy value associated with the sidelink transmit resource pool.

26. The UE of claim 14, wherein the resource pool indicates a single resource, and wherein the one or more resources are the single resource.

27. A non-transitory computer-readable medium storing a set of instructions for wireless communication, the set of instructions comprising:
one or more instructions that, when executed by one or more processors of a user equipment (UE), cause the UE to:
receive a configuration indicating a resource pool and a channel occupancy control parameter for configured grant sidelink communications;
select one or more resources from the resource pool based at least in part on the channel occupancy control parameter; and
transmit a configured grant sidelink communication using the one or more resources from the resource pool,
wherein the configuration indicating the resource pool and the channel occupancy control parameter for configured grant sidelink communications comprises a channel occupancy weighting matrix associated with a set of resources included in the resource pool.

28. An apparatus for wireless communication, comprising:
means for receiving a configuration indicating a resource pool and a channel occupancy control parameter for configured grant sidelink communications;
means for selecting one or more resources from the resource pool based at least in part on the channel occupancy control parameter; and
means for transmitting a configured grant sidelink communication using the one or more resources from the resource pool,
wherein the configuration indicating the resource pool and the channel occupancy control parameter for configured grant sidelink communications comprises a channel occupancy weighting matrix associated with a set of resources included in the resource pool.

* * * * *